US011681611B2

(12) United States Patent
Azizi et al.

(10) Patent No.: US 11,681,611 B2
(45) Date of Patent: *Jun. 20, 2023

(54) RESERVATION ARCHITECTURE FOR OVERCOMMITTED MEMORY

(71) Applicant: Intel Corporation, Santa Clara, CA (US)

(72) Inventors: Omid Azizi, Redwood City, CA (US); Amin Firoozshahian, Mountain View, CA (US); Andreas Kleen, Portland, OR (US); Mahesh Madhav, Portland, OR (US); Mahesh Maddury, Santa Clara, CA (US); Chandan Egbert, San Jose, CA (US); Eric Gouldey, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/119,679

(22) Filed: Dec. 11, 2020

(65) Prior Publication Data

US 2021/0240609 A1    Aug. 5, 2021

Related U.S. Application Data

(63) Continuation of application No. 15/868,819, filed on Jan. 11, 2018, now Pat. No. 10,866,888.

(51) Int. Cl.
*G06F 12/02* (2006.01)
*G06F 9/50* (2006.01)
*G06F 3/06* (2006.01)

(52) U.S. Cl.
CPC ........ *G06F 12/0246* (2013.01); *G06F 3/0604* (2013.01); *G06F 3/065* (2013.01);
(Continued)

(58) Field of Classification Search
CPC .. G06F 12/0246; G06F 3/0604; G06F 3/0608; G06F 3/0641; G06F 3/065; G06F 9/5016; G06F 12/0292
See application file for complete search history.

(56) References Cited

U.S. PATENT DOCUMENTS 5,812,817 A * 9/1998 Hovis ................... G06F 12/023
710/68
9,477,516 B1 * 10/2016 Hockin ................... G06F 9/526
(Continued)

OTHER PUBLICATIONS

"U.S. Appl. No. 15/868,819, Examiner Interview Summary dated May 12, 2020", 3 pgs.
(Continued)

*Primary Examiner* — Eric Cardwell
(74) *Attorney, Agent, or Firm* — Schwegman Lundberg & Woessner, P.A.

(57) ABSTRACT

Various systems and methods for computer memory overcommitment management are described herein. A system for computer memory management includes a memory device to store data and a mapping table; and a memory overcommitment circuitry to: receive a signal to move data in a first block from a memory reduction area in the memory device to a non-memory reduction area in the memory device, the memory reduction area to store data using a memory reduction technique, and the non-memory reduction area to store data without any memory reduction techniques; allocate a second block in the non-memory reduction area; copy the data in the first block to the second block; and update the mapping table to revise a pointer to point to the second block, the mapping table used to store pointers to memory device in the memory reduction area and the non-memory reduction area.

25 Claims, 23 Drawing Sheets

(52) U.S. Cl.
CPC .......... *G06F 3/0608* (2013.01); *G06F 3/0641* (2013.01); *G06F 9/5016* (2013.01); *G06F 12/0292* (2013.01)

(56) References Cited

U.S. PATENT DOCUMENTS

| | | |
|---|---|---|
| 10,866,888 B2 | 12/2020 | Azizi et al. |
| 2010/0005265 A1* | 1/2010 | Odaira ................ G06F 12/0276 711/E12.001 |
| 2016/0246799 A1 | 8/2016 | Constantinescu et al. |
| 2019/0213120 A1 | 7/2019 | Azizi et al. |

OTHER PUBLICATIONS

"U.S. Appl. No. 15/868,819, Final Office Action dated Apr. 20, 2020", 16 pgs.
"U.S. Appl. No. 15/868,819, Non Final Office Action dated Nov. 15, 2019", 15 pgs.
"U.S. Appl. No. 15/868,819, Notice of Allowance dated Jul. 30, 2020", 7 pgs.
"U.S. Appl. No. 15/868,819, Response filed Mar. 16, 20 to Non Final Office Action dated Nov. 15, 2019", 10 pgs.
"U.S. Appl. No. 15/868,819, Response filed Jul. 9, 20 to Final Office Action dated Apr. 20, 2020", 11 pgs.

* cited by examiner

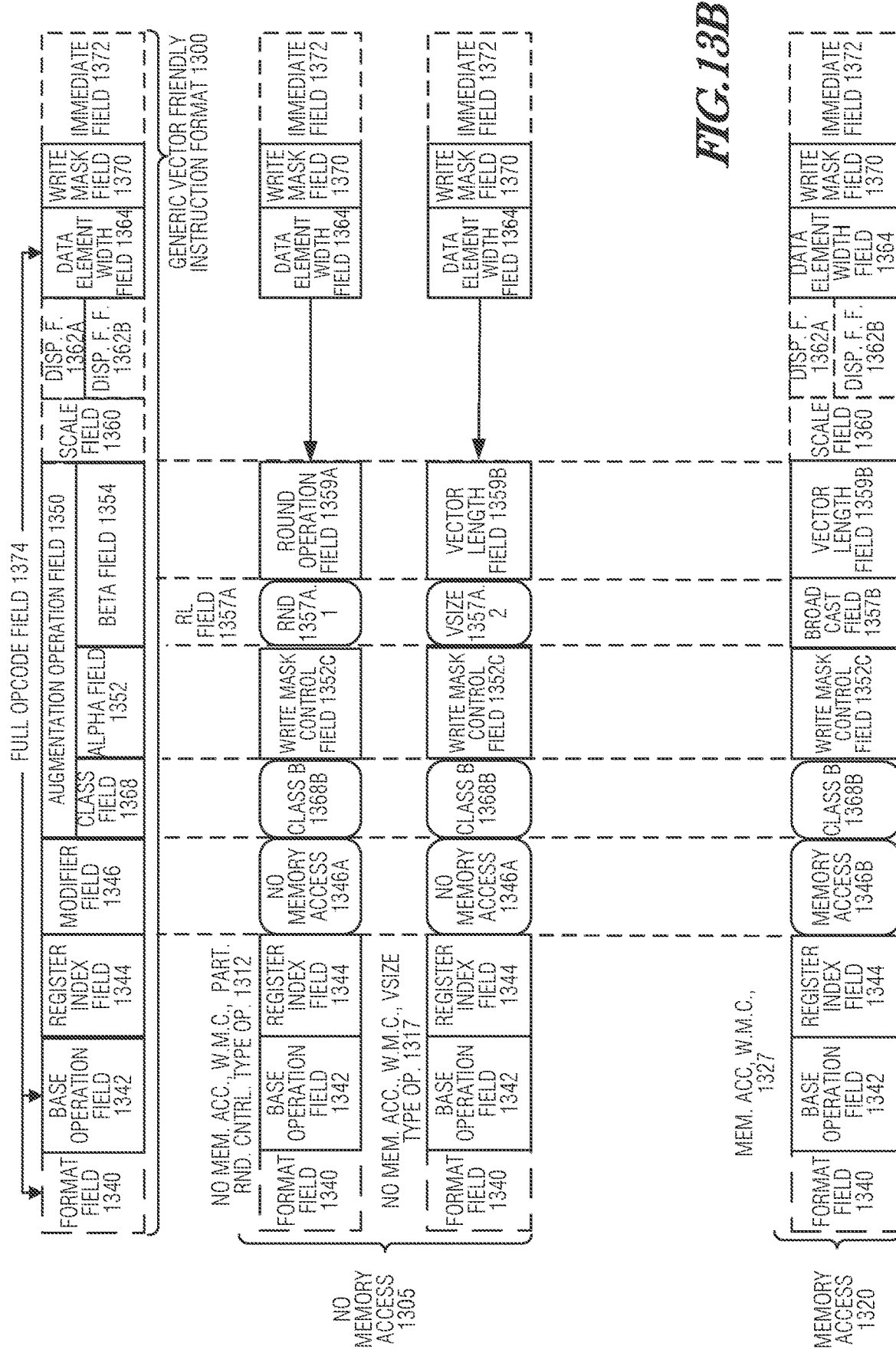

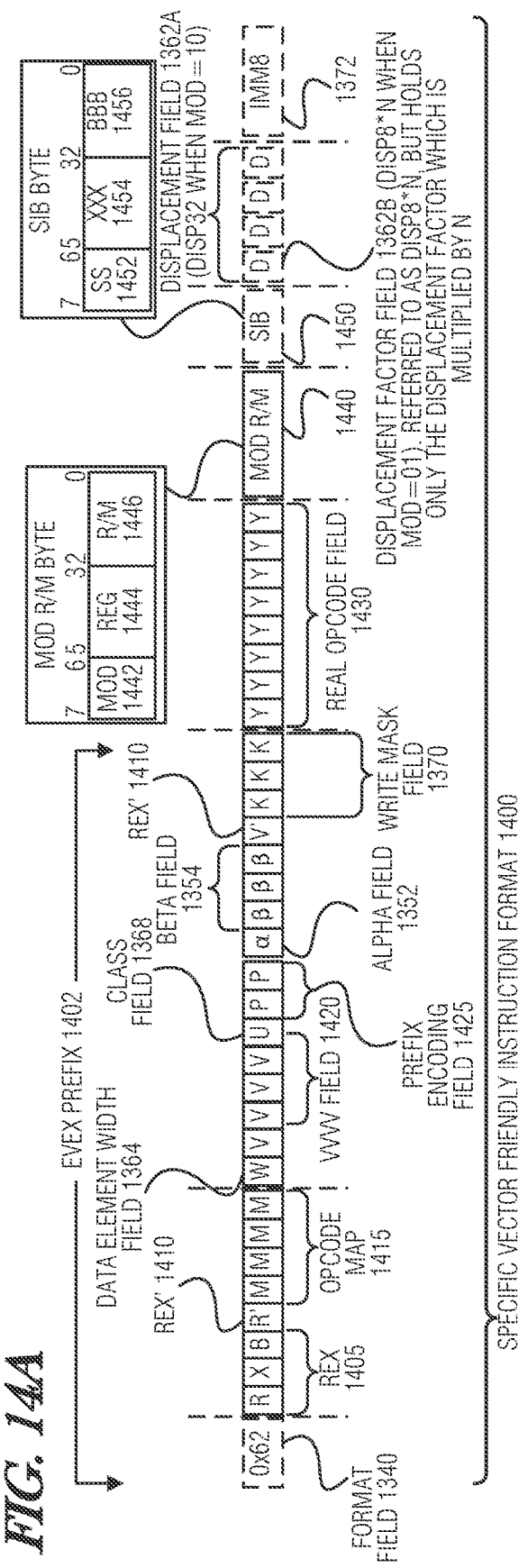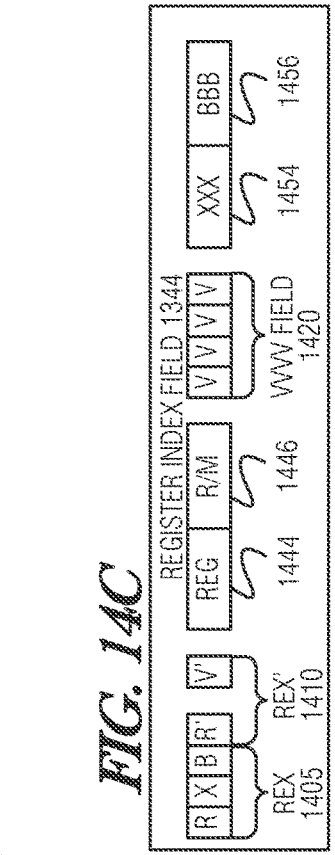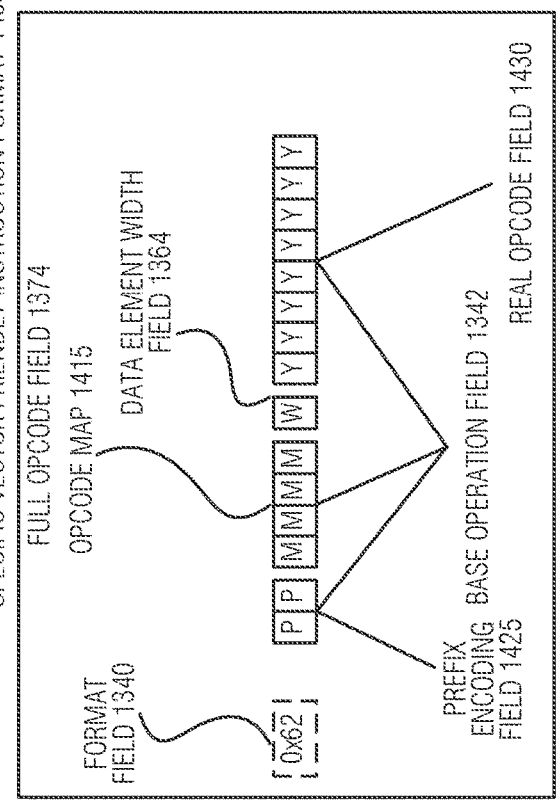

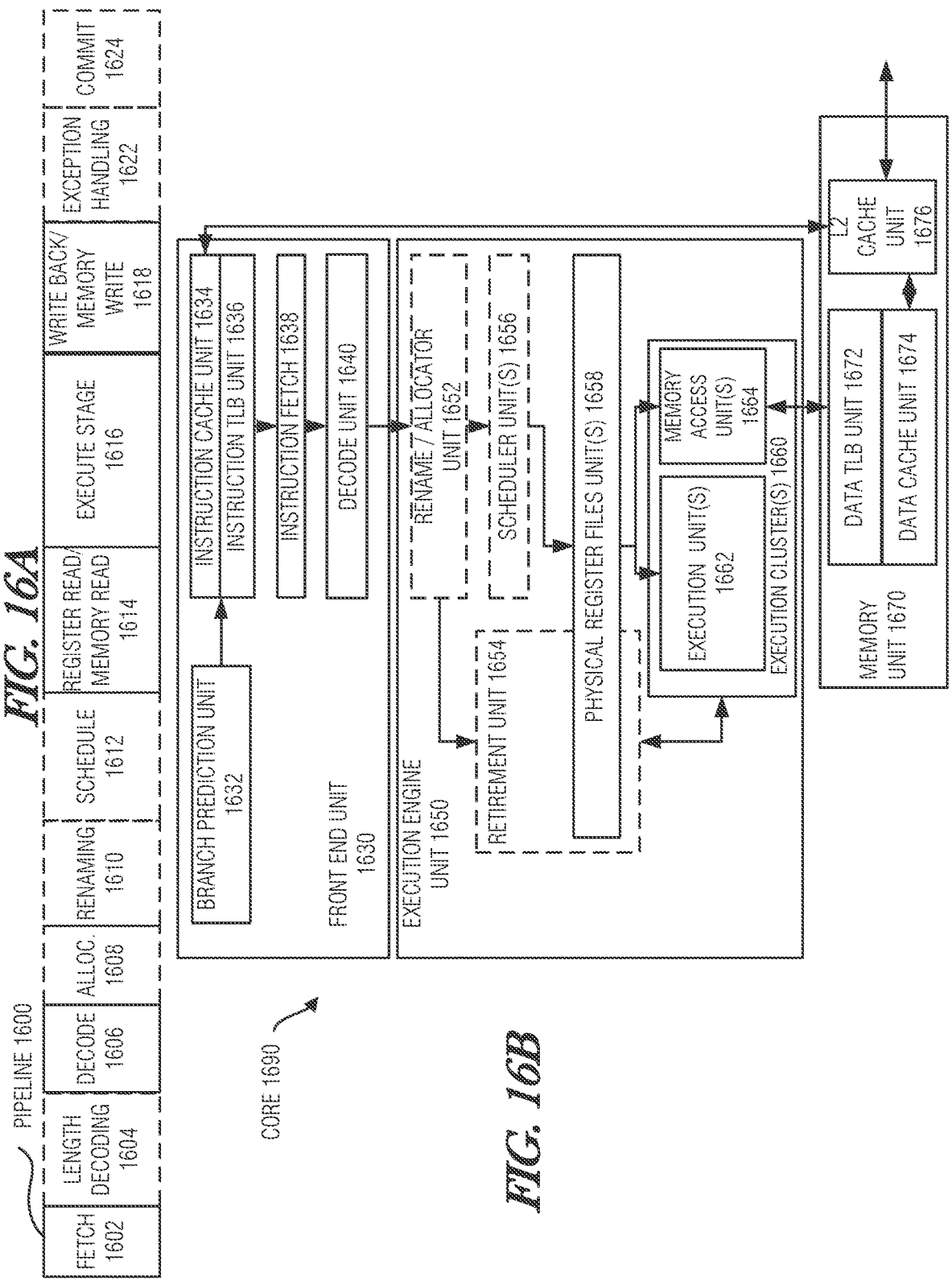

RESERVATION ARCHITECTURE FOR OVERCOMMITTED MEMORY

PRIORITY

This application claims the benefit of priority to U.S. patent application Ser. No. 15/868,819, filed Jan. 11, 2018, which is incorporated by reference herein in its entirety.

TECHNICAL FIELD

Embodiments described herein generally relate to computer memory management, and in particular to systems and methods for implementing a reservation architecture for overcommitted memory.

BACKGROUND

Modern computing systems use an ever increasing amount of memory for operating systems, applications, and data. For efficient use of memory, various memory reduction techniques have been developed. Some memory reduction techniques aim to reduce the amount of memory used by using data compression techniques on the memory contents. Other memory reduction techniques eliminate duplicate copies of data in memory and use references to point to a single copy of the data, such as with memory deduplication techniques. In either case, more addressable memory space is advertised than the actual physical memory available.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 13A-13B are block diagrams illustrating a generic vector friendly instruction format and instruction templates thereof according to an embodiment;

FIGS. 14A-14D are block diagrams illustrating a specific vector friendly instruction format according to an embodiment;

FIG. 16A is a block diagram illustrating both an in-order pipeline and a register renaming, out-of-order issue/execution pipeline according to an embodiment;

FIG. 16B is a block diagram illustrating both an in-order architecture core and a register renaming, out-of-order issue/execution architecture core to be included in a processor according to an embodiment;

DETAILED DESCRIPTION

Figure 1:
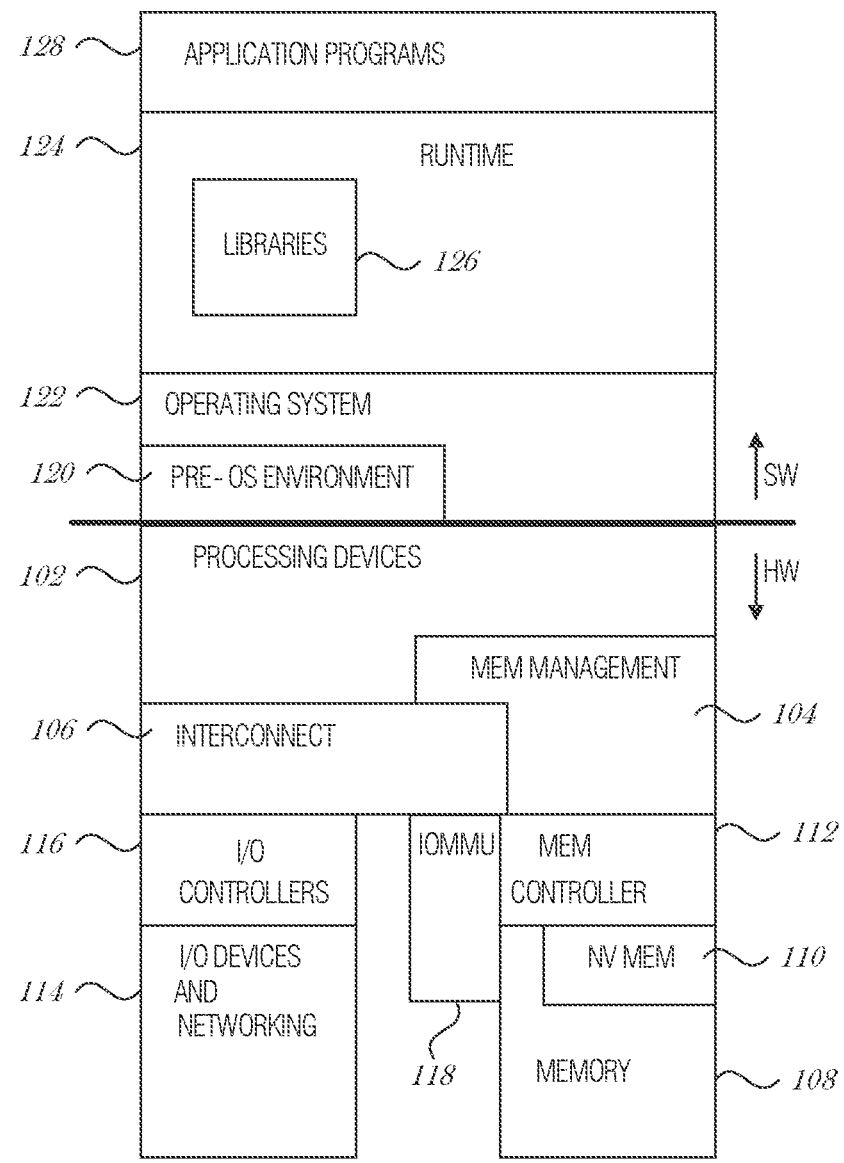
FIG. 1 is a diagram illustrating hardware and software architecture of a computer system, in which various interfaces between hardware components and software components are shown, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Use of memory reduction techniques allow a memory consumer (e.g., an application, an operating system, a process, etc.) to address more memory than is actually available at the physical level. In other words, memory address space is decoupled from memory data space. For instance, an 8 gigabyte (GB) memory device may be advertised as having 12 GB of storage space available. When applications allocate memory in the memory device, some of the applications' data is compressed so that from the applications' point-of-view, there is 12 GB of addressable space (e.g., address space) that indirect into 8 GB of physical memory space (e.g., data space).

In one example, a system may use a memory reduction technique referred to as deduplication. Memory deduplication is the process for efficient memory use. Instead of storing multiple copies of the same data, one deduplicated copy is stored and additional data structures are used to track which processes may use the same "deduplicated" data. Memory deduplication is performed in hardware and may be a part of the memory controller. By deduplicating data, a memory controller may advertise more address space than there is data space.

Another example of memory reduction is a system that uses compression technology to compress contents of the physical memory and hence use memory more efficiently. In such a system when the central processing unit (CPU) writes a block of memory, for example a 4 kilobyte (KB) page, actual physical memory consumption may be much less than 4 KB if the contents of the page are compressed, hence allowing the physical memory to accommodate more contents than the original size of the block that was written.

The difference between the address space (or addressable space) and the data space is determined by the amount of compression (or compression ratio) the data undergoes. Based on various implementations, the compression ratio may be as high as 2:1, 2.5:1, or even higher, of address space to data space.

In such systems, the actual physical memory consumption may vary over time as data contents may have different compression ratios over the course of program execution. Decoupling of the address space from data space prevents system software from being aware of how much physical memory is actually consumed in the system. As a result, this indirection prevents system software from taking necessary actions in cases where physical memory is approaching its limit. Traditionally when the system software manages all physical memory, it is aware of the memory consumption and may start freeing space by swapping out to other forms of storage.

As used herein, a "memory reduction area" is an area of memory where memory reduction techniques are used to compress or deduplicate data. Conversely, a "non-memory reduction area" is an area of memory where memory reduction techniques are not used. Data is stored uncompressed or may be duplicate data.

"Memory pressure" is a condition where physical memory consumption of the data space is approaching its limits (e.g., getting full) and the advertised address space is overcommitted. In such a situation, the memory manager may continue to attempt to allocate memory, thinking that there is underlying data space available, when in reality, the data space is at or near capacity. Attempts to write to a completely full physical memory space may result in data loss, memory errors, crashes, or other error states.

In an overcommitted memory system (e.g., a memory system with compression and/or deduplication), the amount of memory available for use by software varies with the content that is written into memory. In such a system, software may cause the system to run out of usable memory simply by overwriting the contents of already allocated memory pages with less compressible content. The operating system (OS) is expected to deal with this memory pressure by swapping out memory to disk. However, for proper operation, certain memory regions, such as the OS kernel or input/output (IO) buffers, cannot be swapped out, and are required to reside in memory under all scenarios.

What is needed is a reservation mechanism to ensure that critical system processes have sufficient memory allocation. This disclosure describes an innovative approach to improve the operation of a computing system by using a reservation architecture. The reservation architecture may be implemented in hardware and accessible from a software stack, such as through drivers, OS libraries, or the like. The reservation architecture described herein provides an application programming interface (API) to dynamically declare memory regions as being reserved. The API works in tandem with hardware that ensures the reserved memory region cannot become overcommitted—guaranteeing physical memory resources.

FIG. 1 is a diagram illustrating hardware and software architecture 100 of a computing system, in which various interfaces between hardware components and software components are shown, according to an embodiment. As indicated by HW, hardware components are represented below the divider line, whereas software components (denoted by SW) reside above the divider line. On the hardware side, processing devices 102 (which may include one or more microprocessors, digital signal processors, etc., each having one or more processor cores, are interfaced with memory management device 104 and system interconnect 106. Memory management device 104 provides mappings between virtual memory used by processes being executed, and the physical memory. Memory management device 104 may be an integral part of a central processing unit which also includes the processing devices 102.

Interconnect 106 includes a backplane such as memory, data, and control lines, as well as the interface with input/output devices, e.g., PCI, USB, etc. Memory 108 (e.g., dynamic random access memory—DRAM) and non-volatile memory 110 such as flash memory (e.g., electrically-erasable read-only memory—EEPROM, NAND Flash, NOR Flash, etc.) are interfaced with memory management device 104 and interconnect 106 via memory controller 112. This architecture microarchitecture 100 may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 114, which interface with interconnect 106 via corresponding I/O controllers 116.

In a related embodiment, input/output memory management unit IOMMU 118 supports secure direct memory access (DMA) by peripherals. IOMMU 118 may provide memory protection by meditating access to memory 108 from I/O device 114. IOMMU 118 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 120, which is executed at initial system start-up and is responsible for initiating the boot-up of the operating system. One traditional example of pre-OS environment 120 is a system basic input/output system (BIOS). In present-day systems, a unified extensible firmware interface (UEFI) may be implemented. Pre-OS environment 120, is responsible for initiating the launching of the operating system, but also provides an execution environment for embedded applications.

Operating system (OS) 122 provides one or more kernels that control the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 122 provides device drivers, and a variety of common services such as those that facilitate interfacing with peripherals and networking, that provide abstraction for application programs so that the applications do not need to be responsible for handling the details of such common operations. Operating system 122 additionally provides a graphical user interface (GUI) that facilitates interaction with the user via peripheral devices such as a monitor, keyboard, mouse, microphone, video camera, touchscreen, and the like.

Runtime system 124 implements portions of an execution model, including such operations as putting parameters onto the stack before a function call, the behavior of disk input/output (I/O), and parallel execution-related behaviors. Runtime system 124 may also perform support services such as type checking, debugging, or code generation and optimization.

Libraries 126 include collections of program functions that provide further abstraction for application programs. These include shared libraries, dynamic linked libraries (DLLs), for example. Libraries 126 may be integral to the operating system 122, runtime system 124, or may be added-on features, or even remotely-hosted. Libraries 126 define an application program interface (API) through which a variety of function calls may be made by application programs 128 to invoke the services provided by the operating system 122. Application programs 128 are those programs that perform useful tasks for users, beyond the tasks performed by lower-level system programs that coordinate the basis operability of the computing device itself.

Figure 2:
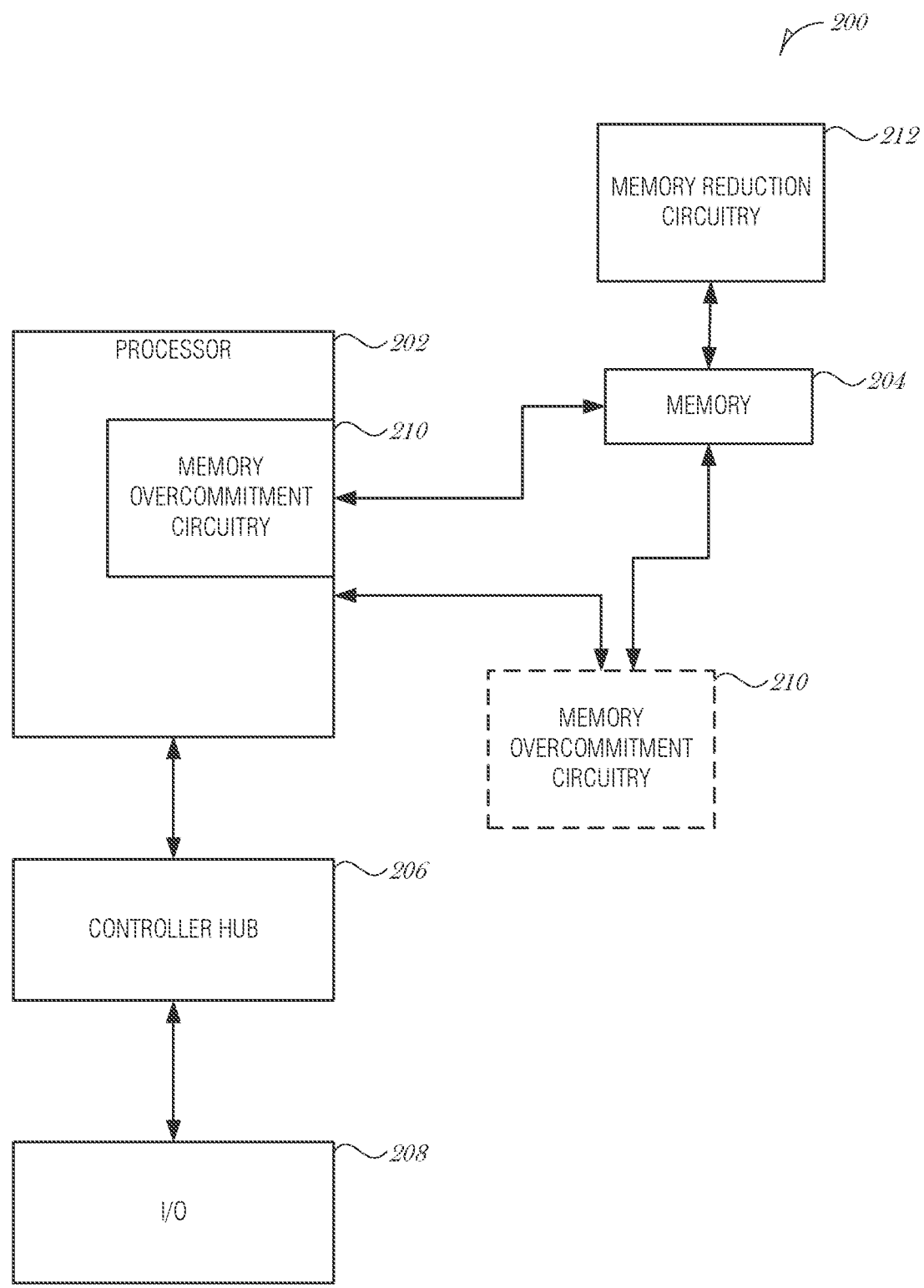
FIG. 2 is a block diagram illustrating a memory overcommitment system, according to an embodiment.

FIG. 2 is a block diagram illustrating a memory overcommitment system 200, according to an embodiment. The memory overcommitment system 200 includes a processor 202, a memory device 204, a controller hub 206, and input/output (I/O) devices 208. While only one processor 202 is illustrated in FIG. 2, it is understood that one or more processors 202 may be included in the system 200.

The processor 202 is coupled to the controller hub 206 to pass control signals and data to I/O devices 208. The controller hub 206 may include sub-controllers, such as a graphics memory controller hub (GMCH) or an I/O hub (IOH), which may be on separate chips. The controller hub 206 communicates with the processor 202 via a multi-drop bus, such as a frontside bus (FSB), point-to-point interface such as QuickPath Interconnect (QPI), or similar connection. In various embodiments, the controller hub 206 may be an instance of controller hub 1820 of FIG. 18.

The memory 204 is coupled directly to the processor 202. The memory 204 may be, for example, dynamic random access memory (DRAM), phase change memory (PCM), or a combination of the two.

The system 200 also includes a memory overcommitment circuitry 210, which may be integrated into a memory controller in the processor 202, or may be a separate unit. For instance, the memory overcommitment circuitry 210 may be a coprocessor or other special-purpose processor.

Figure 3:
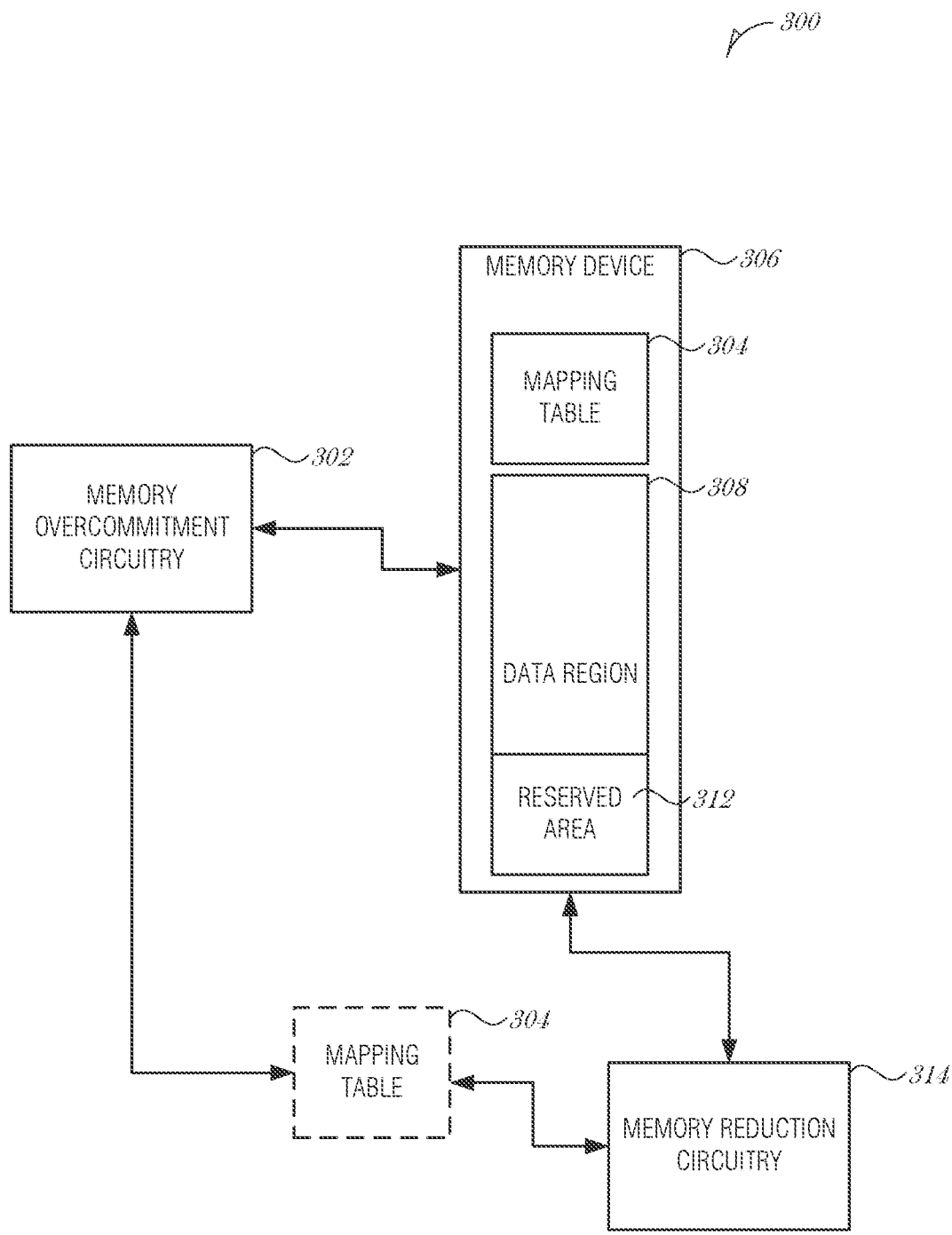
FIG. 3 is a block diagram illustrating a memory overcommitment system, according to an embodiment.

FIG. 3 is a block diagram illustrating a memory overcommitment system 300, according to an embodiment. The memory overcommitment system 300 includes memory overcommitment circuitry 302, a mapping table 304, and a memory device 306. The memory device 306 stores a data region 308. The data region 308 stores the data contents that are written into the memory system. The data stored may be compressed, deduplicated, or both. In some implementations, the memory device 306 also stores the mapping table 304 in a separate area from the data region 308. In yet other implementations, the mapping table 304 may be stored on a separate device from the data region 308.

The memory overcommitment circuitry 302 may be part of or integrated to operate with memory controllers or other interfaces, such as memory management device 104 or memory controller 112 of FIG. 1. Alternatively, memory overcommitment circuitry 302 may be part of or integrated to operate with processor 1700 or memory controller unit 1714 of FIG. 17, for example. The memory overcommitment circuitry 302 may be a controller that is separate from existing memory control devices. In general, the memory overcommitment circuitry 302 may be located anywhere between the processor cores and the memory device 306. While the memory overcommitment circuitry 302 may be incorporated into a memory controller, it may also be a separate circuit on-die with the cores, or off-die from the cores as a separate ASIC, FPGA, or other circuitry.

The memory overcommitment circuitry 302 supports various memory reduction techniques, such as compression or deduplication. To service an address request received from a requester, for example a CPU 310, the memory overcommitment circuitry 302 references the mapping table 304 to indirect into the data region of the memory device 306. The memory overcommitment circuitry 302 manages all accesses to the memory 306. This hardware intercepts all traffic, and implements the logic to (1) determine where the data for an address resides, and (2) store and free data in the data region 308 as necessary.

The mapping table 304 includes mappings from address space to data space, or in other words, from logical address space to physical data space. In an embodiment, the mapping table 304 is a table of pointers that map system addresses from the CPU to the location of the compressed or deduplicated data on the physical memory device 306. In the simplest embodiment, the mapping table 304 maps fixed-size chunks of the address space into compressed or deduplicated chunks in the data region 308 on the memory device 306. To provide for a reservation architecture, the mapping table 304 may include additional flags to store whether an address or address range in the memory device 306 is reserved.

In some embodiments, a reserved area 312 is allocated in the memory device 306. The reserved area 312 may be a portion of the data region 308. In the reserved area 312 of the memory device 306, memory reduction (e.g., compression or deduplication) techniques are disabled. Thus, address space maps directly onto the data space, with the appropriate address translation through the mapping table 304. In this manner, the applications using the reserved memory space 308 have a guarantee of underlying physical data space for a given address space. As such, when an address or address range is marked as reserved in the mapping table 304, it means that memory reduction techniques are disabled for that address or range.

Memory reduction circuitry 314 is used to compress/deduplicate data in the data region 308. The memory reduction circuitry 314 is configured to ignore data that is stored in the reserved area 312. The memory reduction circuitry 314 may be incorporated into the memory overcommitment circuitry 302 or may be a separate special-purpose circuitry for memory reduction techniques.

Figure 4:
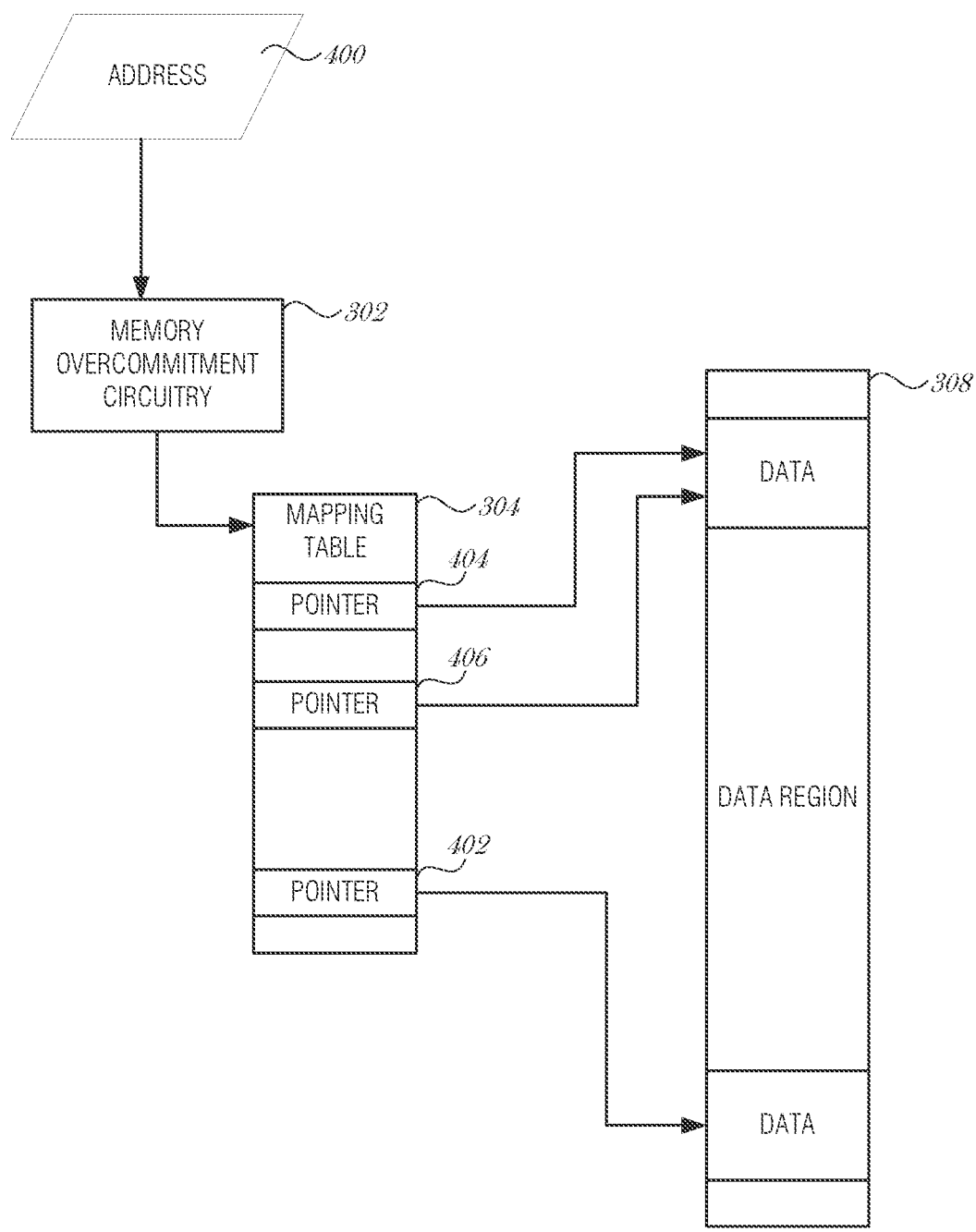
FIG. 4 is a block diagram illustrating mapping table and data region use, according to an embodiment.

FIG. 4 is a block diagram illustrating mapping table 304 and data region 308 use, according to an embodiment. An address 400 is received by the memory overcommitment circuitry 302, and the memory overcommitment circuitry 302 may refer to the mapping table 304 to determine the physical address in the data region 308. As illustrated, a given portion of the data region 308 may be pointed to by one pointer (e.g., pointer 402) or by several pointers (e.g., pointers 404 and 406). When data is referenced by several pointers, this is an illustration of deduplication—both pointers 404 and 406 point to the same data, thereby reducing the overall memory usage in the data region 308. Data in data blocks may also be compressed, depending on the implementation, which would provide an even higher memory compression ratio.

Figure 5:
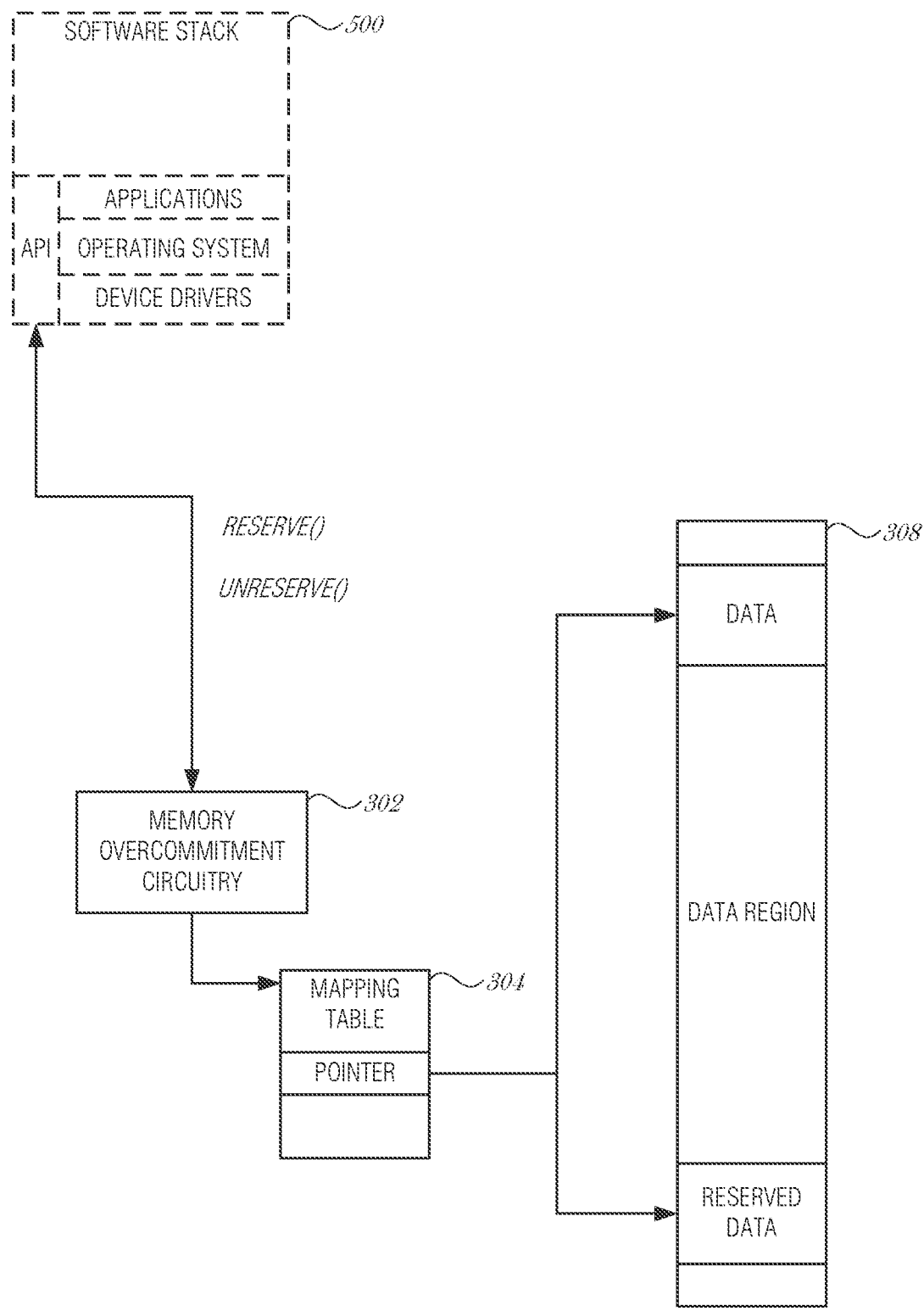
FIG. 5 is a block diagram illustrating data and control flow when using memory overcommitment circuitry, according to an embodiment.

FIG. 5 is a block diagram illustrating data and control flow when using memory overcommitment circuitry 302, according to an embodiment. A software stack 500 is used to interface with the memory overcommitment circuitry 302. The software stack 500 may include drivers, libraries, applications, or other software components in an operating system, user application space, or the like. An application programming interface (API) is exposed to components in the software stack 500. The API is used to control the operation of the memory overcommitment circuitry 302.

The API includes at least two functions: a reserve( ) function and an unreserve ( ) function. It is understood that additional functions may be developed and exposed via the API.

The reserve( ) function is used to set aside areas in the data region 308 and ensure that for those areas, the address space reflects the true data space for reserved blocks. In effect, the reserve( ) function disables memory reduction (e.g., compression or deduplication) on reserved blocks. The reserve( ) function is used on addresses which have existing data, and which may have been placed in an area of the data region 308 that uses memory reduction (e.g., compression or deduplication). As such, the reserve( ) function will copy blocks to another portion of the data region 308 so that it is able to exist without sharing with another pointer (e.g., data deduplication) or in an uncompressed form (if previously compressed). Reserved blocks may existing in non-contiguous areas within the data region 308.

The reserve( ) function takes the form reserve (address, size), where address is the logical address of a block of data, and size is the size of the data. The reserve( ) function may be called by an operating system process, for example, to place existing data into a reserved portion of the data region 308.

Figure 6:
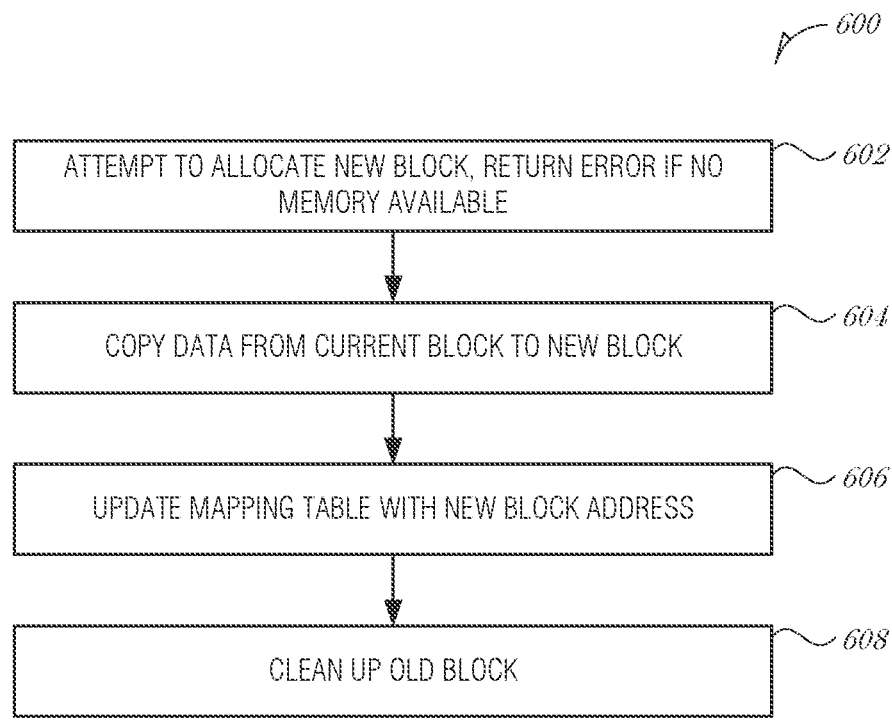
FIG. 6 is a flowchart illustrating a method for remapping data in a data region, according to an embodiment.

In response to receiving a reserve( ) function call, the memory overcommitment circuitry 302 performs the method 600 illustrated in FIG. 6. FIG. 6 is a flowchart illustrating a method 600 for remapping data in a data region 308, according to an embodiment. At 602, the memory overcommitment circuitry 302 attempts to allocate a new block of data out of the data region 308 that matches the size specified in the reserve( ) call. If the memory overcommitment circuitry 302 is not able to allocate the memory, it returns a failure notification to the calling software.

At 604, the memory overcommitment circuitry 302 copies the contents of the current block from the data region corresponding to the address as provided in the reserve( ) call, to the newly allocated data block in the data region 308. It is understood that the address provided in the reserve( ) call is resolved using the mapping table 304 to find the physical memory address. During this copy operation, the data is decompressed if needed.

At 606, the memory overcommitment circuitry 302 updates the mapping table 304 to update the pointer to point to the new block. The memory overcommitment circuitry 302 also marks the pointer in the mapping table 304 as pointing to a reserved block in the data region 308. Marking the pointer in this way provides a signal to memory reduction circuitry 314 to ignore the pointer for memory compression functions. Memory reduction circuitry 314 is used to compress and/or deduplicate data in the data region 308. The memory reduction circuitry 314 may scan the data region 308 for duplicate data and update the mapping table 304 when consolidating the duplicate data (e.g., deduplicate data). Additionally, or alternatively, the memory reduction circuitry 314 may implement one or more compression techniques to compress data in the data region 308 and maintain the mapping table 304 so that the compression of such data is transparent to the owner process.

Marking also provides other optimizations. For instance, the markings may be used to simplify overwrite semantics. When data is reserved, any overwrite is guaranteed to succeed using the existing resources because the data size will not exceed the allotted memory (e.g., no compression). For non-reserved pointers, a new write the same address may require additional memory reduction processes, e.g., compression/deduplication, including a potential search for more resources.

In some embodiments, pointers in the mapping table 304 are not marked as being reserved or unreserved.

At 608, the memory overcommitment circuitry 302 cleans up the old block. It may reduce a reference counter to the old block so that if multiple pointers were referencing the old block, the memory overcommitment circuitry 302 or other circuitry knows that there is one fewer pointer referencing it after the copy. The memory overcommitment circuitry 302 may also deallocate the block if it is no longer required (e.g., there are no pointers referencing it). For instance, the memory overcommitment circuitry 302 may decrement the reference counter for the block, check to see if the reference counter is zero, and if it is zero, then deallocate the block.

Returning to FIG. 5, the unreserve( ) function takes the form unreserve (address, size), where address is the logical address of a block of data, and size is the size of the data. The unreserve( ) function may be called by an operating system process, for example, to unflag data and remove its reserved status in the data region 308.

Figure 7:
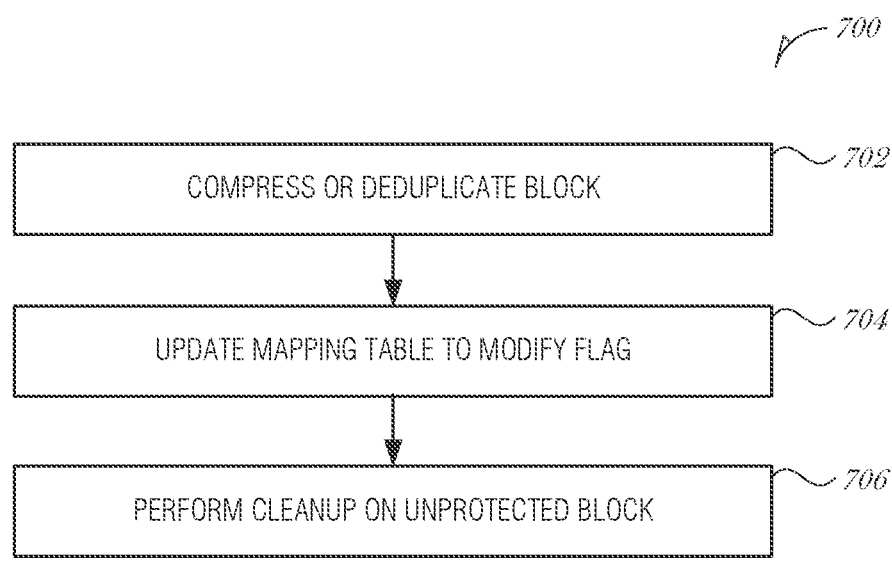
FIG. 7 is a flowchart illustrating a method for remapping data in a data region, according to an embodiment.

In response to receiving an unreserve( ) function call, the memory overcommitment circuitry 302 performs the method 700 illustrated in FIG. 7. FIG. 7 is a flowchart illustrating a method 700 for remapping data in a data region 308, according to an embodiment. At 702, the memory overcommitment circuitry 302 applies memory reduction (e.g., compression or deduplication) to a block. Both compression and deduplication may be used depending on the design. At 704, the memory overcommitment circuitry 302 updates the mapping table 304 to modify the flag so that the pointer is no longer flagged as referring to reserved data. At 706, the memory overcommitment circuitry 302 may perform memory clean up processes on the now-unreserved data block. For instance, the data in the released block may be compared to other data in the data region 308. If a duplicate is found, then the mapping table 304 may be updated to point to the duplicate block. As another example, after compression, unused portions of the block may be released and reallocated for other storage.

Returning to FIG. 5, as described, the reserve( ) and unreserve( ) functions act to flag and unflag memory regions. The reserve( ) and unreserve( ) functions also rewrite the data, applying memory compression and decompression, respectively. However, the disadvantage of these versions of reserve( ) and unreserve( ) is that there is no guarantee that there are any available memory resources upon a reserve( ) call. Moreover, allocating memory resources is time-consuming and expensive.

Figure 8:
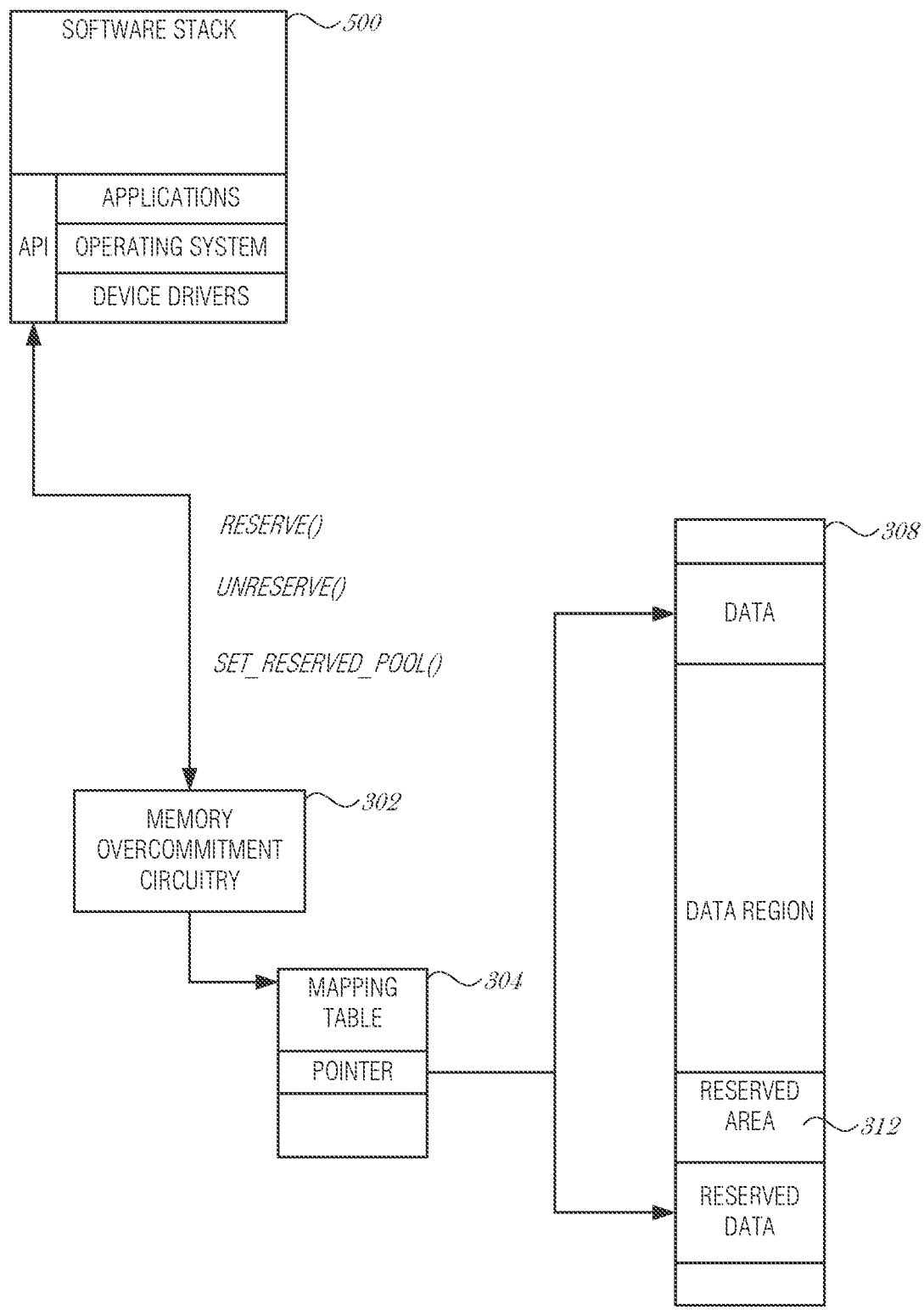
FIG. 8 is a block diagram illustrating a second data and control flow when using memory overcommitment circuitry, according to an embodiment.

FIG. 8 is a block diagram illustrating a second data and control flow when using a memory overcommitment circuitry 302, according to an embodiment. In the example illustrated in FIG. 8, a third API call is exposed to the software stack 500. In addition to reserve( ) and unreserve( ) functions, a set_reserved_pool( ) function is exposed.

The set_reserved_pool( ) function takes the form set_reserved_pool (size), where size is the size of the data region 308 to use as a reserve pool. The size may be a number of blocks, bytes, sectors, pages, or other units depending on the design of the memory system microarchitecture. The addition of the set_reserved_pool( ) function provides an optimized API that decouples the operations of finding memory resources for reservations from the remapping of contents into reserved memory.

In this model, a pool of unmapped reserved memory is maintained to allow for quicker reservations. This reduces the overhead of finding and allocating a new block. This is significant, because finding a block for allocation may be a long-latency operation under some scenarios.

The software stack 500 may initially set the reserve pool size and then track its usage. In this way, the software stack 500 is able to determine whether a reserve( ) call will be successful or not and block it at the software layer. If need be, the software stack 500 may issue another set_reserved_pool( ) call and grow the reserved area 312. The set_reserved_pool( ) function may also shrink the reserved area 312 when desired.

Figure 9:
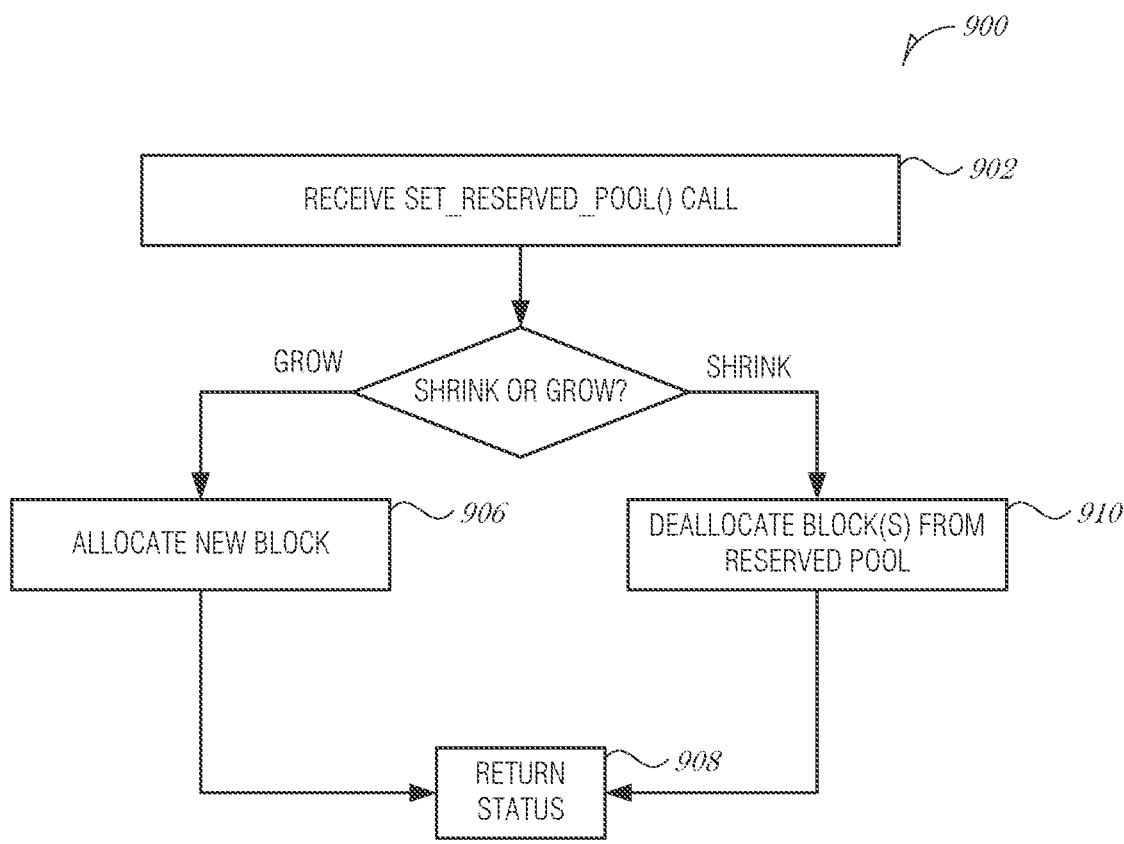
FIG. 9 is a flowchart illustrating a method for remapping data in a data region, according to an embodiment.

In response to receiving a set_reserved_pool( ) function call, the memory overcommitment circuitry 302 performs the method 900 illustrated in FIG. 9. FIG. 9 is a flowchart illustrating a method 900 for remapping data in a data region 308, according to an embodiment. At 902, a set_reserved_pool( ) call is received. The current reserved pool size is known. The parameter of the set_reserved_pool( ) is compared to the current reserved pool size to determine whether the received set_reserved_pool( ) call is to grow or shrink the reserved pool (e.g., reserved area 312) (decision operation 904).

If the set_reserved_pool( ) call is to grow the reserved pool, then at 906, the memory overcommitment circuitry 302 attempts to allocate a new block of data out of the data region 308. If the current reserved pool size is zero (e.g., there is no reserved pool), then the memory overcommitment circuitry 302 allocates an area of the data region 308 that matches the size specified in the set_reserved_pool( ) call. The memory overcommitment circuitry 302 returns a status (operation 908). If the memory overcommitment circuitry 302 is not able to allocate the memory, it returns a failure notification to the calling software, otherwise it returns a success notification.

If the set_reserved_pool( ) call is to shrink the reserved pool, then at 910, the memory overcommitment circuitry 302 attempts to resize the reserved area 312 in the data region 308. The memory overcommitment circuitry 302 searches for a reserved, but unused block in the reserved area 312, and deallocates it, logically reassigning it to the data region 308. This deallocation process may be used more than once to reduce the size of the reserved area 312 to the size provided in the set_reserved_pool( ) call. The memory overcommitment circuitry 302 returns a status (operation 908). If the memory overcommitment circuitry 302 is not able to deallocate the memory, it returns a failure notification to the calling software, otherwise it returns a success notification.

Returning to FIG. 8, when using a reserved area 312 of the data region 308, data has to be copied from one area to the other upon a reserve( ) operation. A straightforward modification to the reserve( ) operation discussed in FIG. 6 will achieve this. Instead of allocating the new block in the general area of the data region 308, the reserve( ) function will allocate a block out of the reserved area 312. As discussed above, the allocation should always succeed if the software stack 500 is managing memory correctly.

Figure 10:
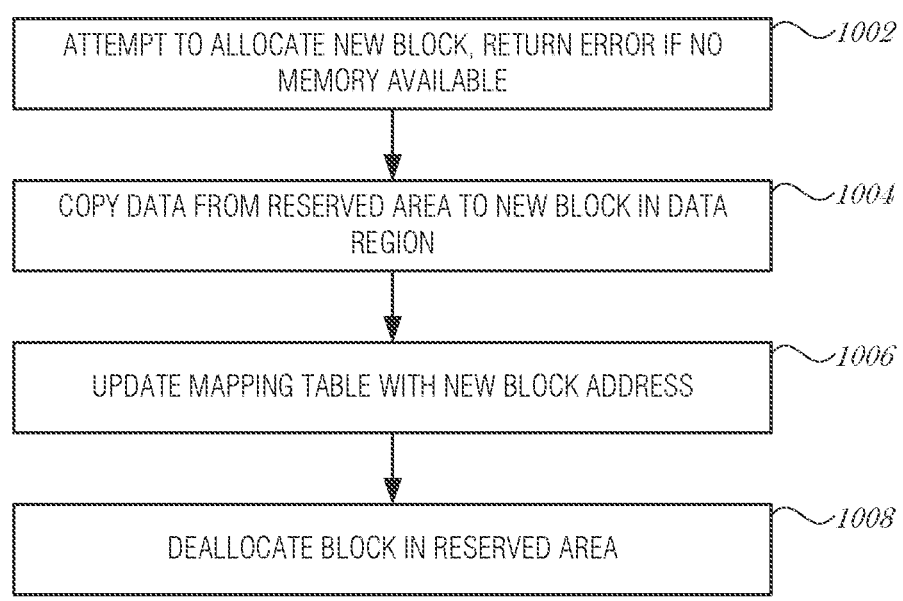
FIG. 10 is a flowchart illustrating a method for remapping data in a data region, according to an embodiment.

In response to receiving an unreserve( ) function call, the memory overcommitment circuitry 302 performs the method 1000 illustrated in FIG. 10. FIG. 10 is a flowchart illustrating a method 1000 for remapping data in a data region 308, according to an embodiment. At 1002, the memory overcommitment circuitry 302 attempts to allocate a new block of data out of the data region 308 to accommodate data of the size specified in the unreserve( ) call. It is understood that a smaller region may be allocated in the data region 308 than the size provide in the unreserve( ) call because the data will be compressed or deduplicated when moved to the data region 308. If the memory overcommitment circuitry 302 is not able to allocate the memory, it returns a failure notification to the calling software.

At 1004, the memory overcommitment circuitry 302 copies the contents of the current block from the address as provided in the unreserve( ) call, out of the reserved area 312 to the newly allocated data block in the data region 308. It is understood that the address provided in the unreserve( ) call is resolved using the mapping table 304 to find the physical memory address.

At 1006, the memory overcommitment circuitry 302 updates the mapping table 304 to update the pointer to point to the new block. The memory overcommitment circuitry 302 also marks the pointer in the mapping table 304 to indicate that it is not pointing to a reserved area 312 of the data region 308. After unreserving the data, memory reduction circuitry may compress the data contents, deduplicate the data, or perform other memory compression functions.

At 1008, the memory overcommitment circuitry 302 deallocates the block that contained the previously-reserved data to free space in the reserved area 312.

The memory overcommitment circuitry 302 may attempt to allocate a new block of data out of the data region 308 in response to an unreserve( ) call. If the data region is 308 full though, the allocation may fail. According to the method 1000 of FIG. 10, in this case the memory overcommitment circuitry 302 may cease operations and return an error. In an alternative embodiment, the memory overcommitment circuitry 302 may instead change the reserved area pool size instead of erroring out. For instance, the memory overcommitment circuitry 302 may shrink the reserved area pool size enough such that the new unreserved( ) data is able to exist outside of the reserved area. After resizing the reserved area pool, the memory overcommitment circuitry 302 may send a message up the software stack so that memory managers are aware of the pool size being changed. In yet a further embodiment, the pool size may change on every unreserve( ) call, in which case the pool will shrink automatically when data is unreserved and with memory reduction (e.g., compression or deduplication) being used, there is never a situation where the unreserve( ) function could fail.

Figure 11:
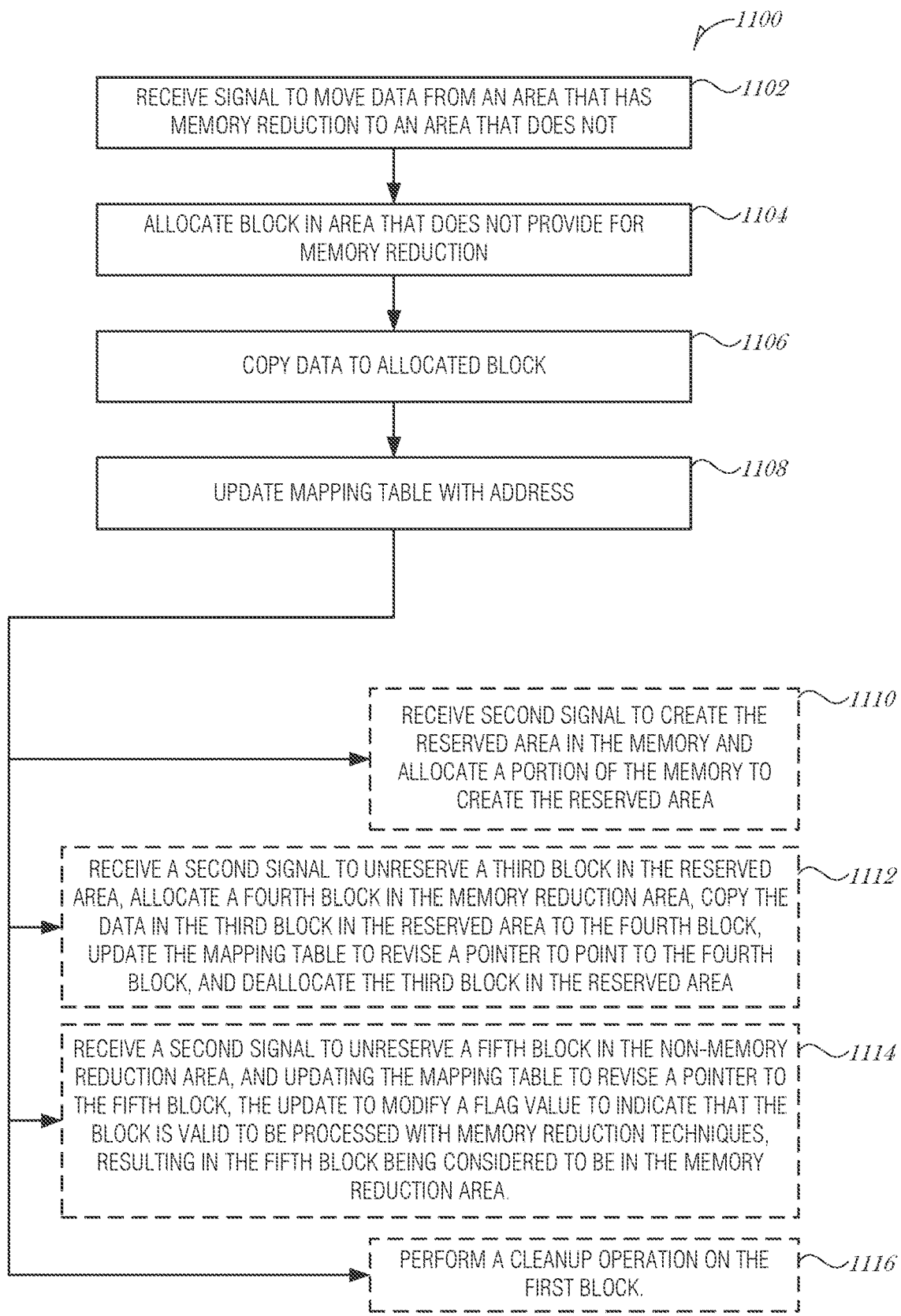
FIG. 11 is a flowchart illustrating a method for computer memory overcommitment management, according to an embodiment.

FIG. 11 is a flowchart illustrating a method 1100 for computer memory management, according to an embodiment. At 1102, a signal to move data in a first block from a memory reduction area in a memory to a non-memory reduction area in the memory is received at a memory overcommitment circuitry. In such an embodiment, the memory reduction area is configured to store data using a memory reduction technique, and the non-memory reduction area configured to store data without any memory reduction techniques. In an embodiment, the signal to move the data in the first block includes an address parameter, where the address parameter corresponds to a physical device address, the correspondence stored in the mapping table.

In an embodiment, the memory reduction technique includes memory data compression. In a related embodiment, the memory reduction technique includes memory deduplication.

At 1104, a second block is allocated in the non-memory reduction area.

At 1106, the data in the first block is copied to the second block.

At 1108, a mapping table is updated to revise a pointer to point to the second block. The mapping table may be used to store pointers to memory in the memory reduction area and the non-memory reduction area.

In an embodiment, updating the mapping table includes modifying a flag value to indicate that the second block is not to be processed with memory reduction techniques. In a further embodiment, the non-memory reduction area is a reserved area in the memory. In yet a further embodiment, the method 1100 includes receiving, at the memory overcommitment circuitry, a second signal to create the reserved area in the memory and allocating a portion of the memory to create the reserved area (block 1110).

In an embodiment, the method 1100 includes receiving, at the memory overcommitment circuitry, a second signal to unreserve a third block in the reserved area, allocating a fourth block in the memory reduction area, copying the data in the third block in the reserved area to the fourth block, updating the mapping table to revise a pointer to point to the fourth block, and deallocating the third block in the reserved area (block 1112).

In an embodiment, the method 1100 includes receiving, at the memory overcommitment circuitry, a second signal to unreserve a fifth block in the non-memory reduction area, and updating the mapping table to revise a pointer to the fifth block, the update to modify a flag value to indicate that the block is valid to be processed with memory reduction techniques, resulting in the fifth block being considered to be in the memory reduction area. In a further embodiment, the method 1100 may include performing a memory reduction technique on the fifth block (block 1114).

In an embodiment, the method 1100 includes performing a cleanup operation on the first block. In a further embodiment, performing the cleanup operation on the first block includes decrementing a reference counter, the reference counter indicating how many pointers are pointing to the first block, and deallocating the first block when the reference counter is zero (block 1116).

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.)

corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 12:
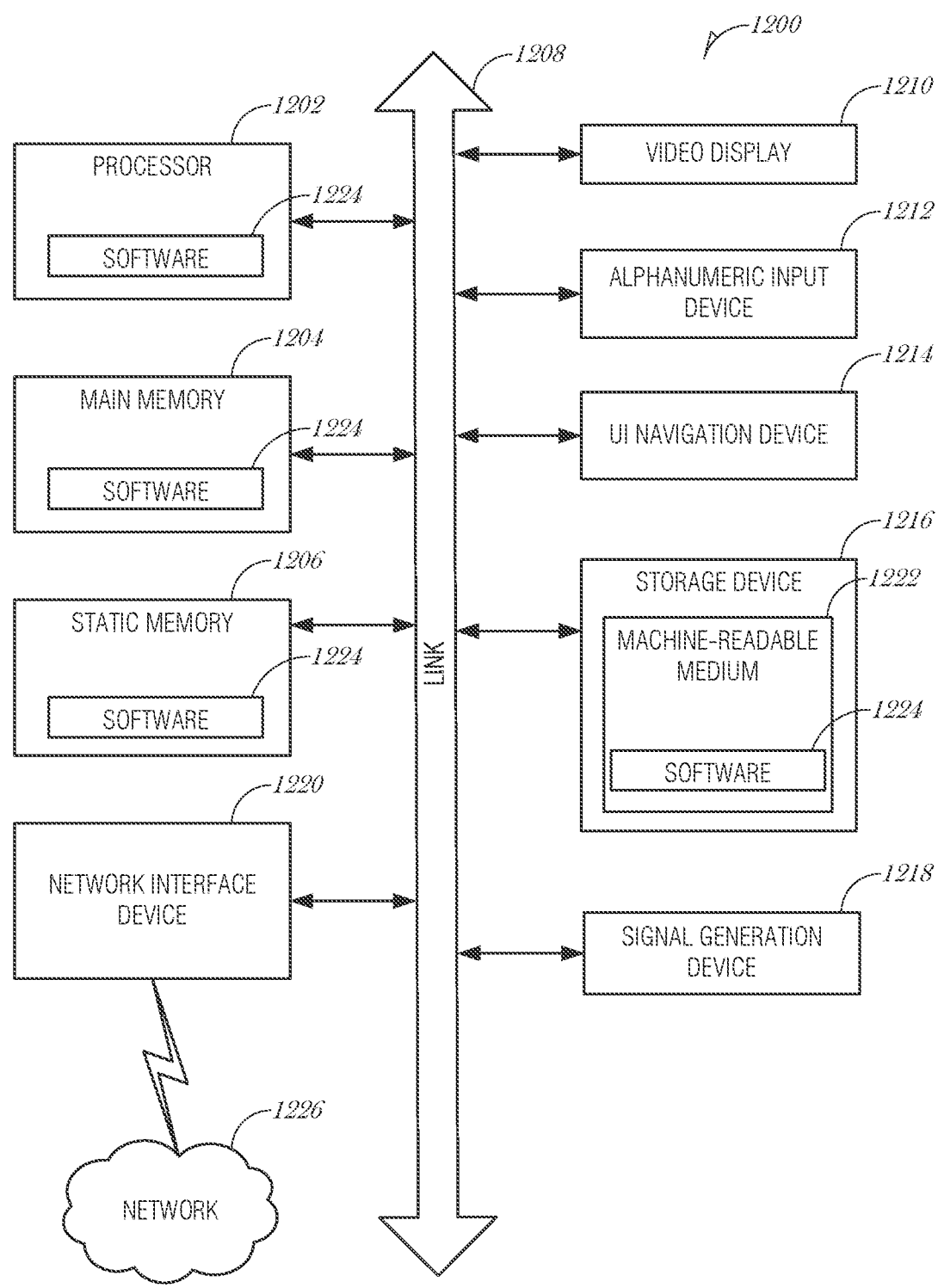
FIG. 12 is a block diagram illustrating an example machine upon which any one or more of the techniques (e.g., methodologies) discussed herein may perform, according to an embodiment.

FIG. 12 is a block diagram illustrating a machine in the example form of a computer system 1200, within which a set or sequence of instructions may be executed to cause the machine to perform any one of the methodologies discussed herein, according to an embodiment In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1200 includes at least one processor 1202 (e.g., a central processing unit (CPU), a graphics processing unit (GPU) or both, processor cores, compute nodes, etc.), a main memory 1204 and a static memory 1206, which communicate with each other via a link 1208 (e.g., bus). The computer system 1200 may further include a video display unit 1210, an alphanumeric input device 1212 (e.g., a keyboard), and a user interface (UI) navigation device 1214 (e.g., a mouse). In one embodiment, the video display unit 1210, input device 1212 and UI navigation device 1214 are incorporated into a touch screen display. The computer system 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, gyrometer, magnetometer, or other sensor.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the computer system 1200, with the main memory 1204, static memory 1206, and the processor 1202 also constituting machine-readable media.

While the machine-readable medium 1222 is illustrated in an example embodiment to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The figures below detail architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Instruction Formats

Embodiments of the instruction(s) described herein may be embodied in different formats. Additionally, systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
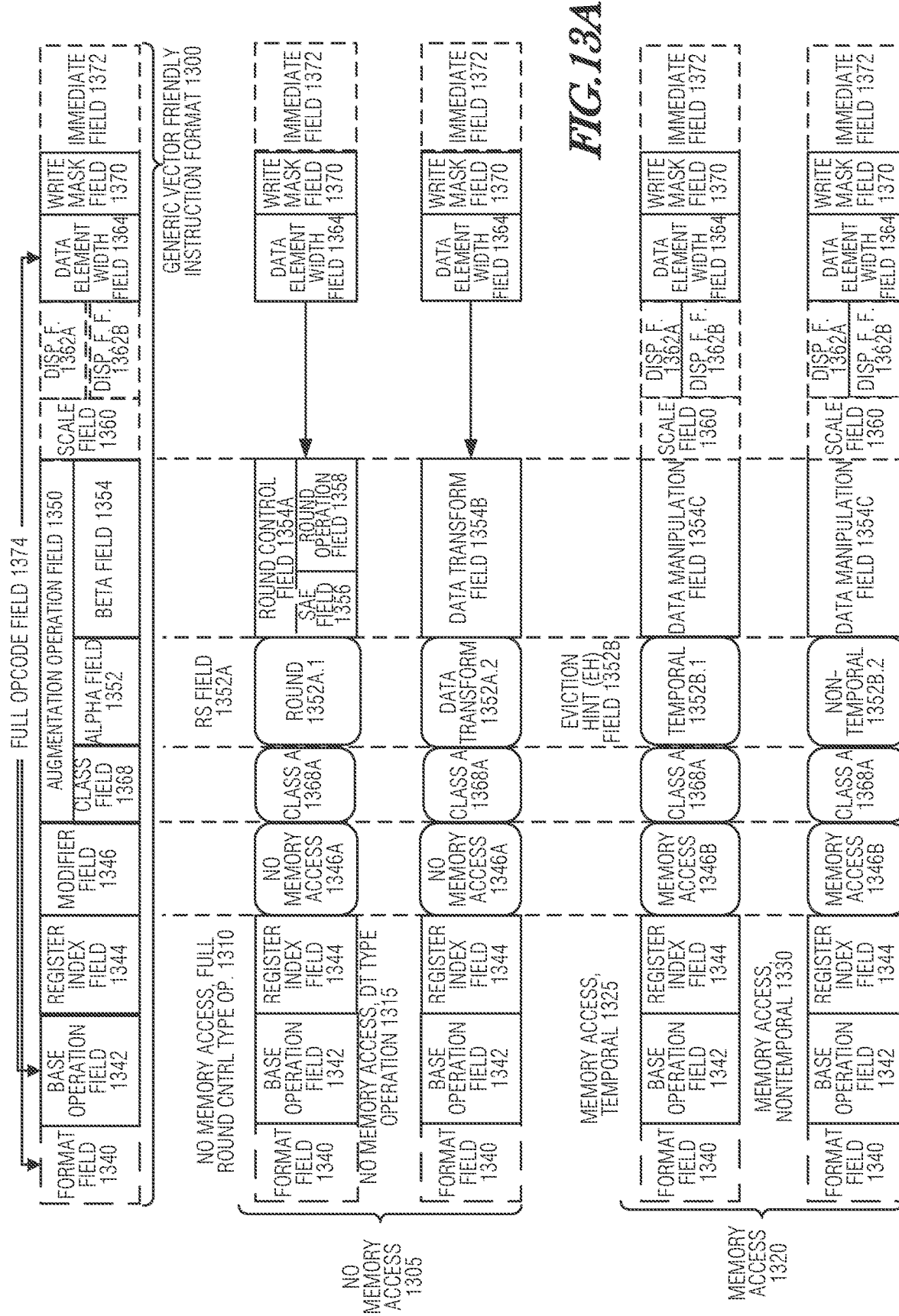

FIGS. 13A-13B are block diagrams illustrating a generic vector friendly instruction format and instruction templates thereof according to an embodiment. FIG. 13A is a block diagram illustrating a generic vector friendly instruction format and class A instruction templates thereof according to an embodiment; while FIG. 13B is a block diagram illustrating the generic vector friendly instruction format and class B instruction templates thereof according to an embodiment. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a PxQ (e.g., 32×512, 16×128, 32×1024, 64×1024) register file. While in an embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in an embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In an embodiment, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses 2scale*index+base).

Displacement Field 1362A—its content is used as part of memory address generation (e.g., for address generation that uses 2scale*index+base+displacement).

Displacement Factor Field 1362B (note that the juxtaposition of displacement field 1362A directly over displacement factor field 1362B indicates one or the other is used)— its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in another embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in an embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-13B, the contents of this field select between class A and class B instructions. In FIGS. 13A-13B, rounded corner squares are used to indicate a specific value is present in a field (e.g., class A 1368A and class B 1368B for the class field 1368 respectively in FIGS. 13A-13B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In an embodiment where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In an embodiment where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Specific Vector Friendly Instruction Format

FIG. 14 is a block diagram illustrating a specific vector friendly instruction format according to an embodiment FIG. 14 shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 13 into which the fields from FIG. 14 map are illustrated.

It should be understood that, although embodiments are described with reference to the specific vector friendly instruction format 1400 in the context of the generic vector friendly instruction format 1300 for illustrative purposes, the invention is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the invention is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in an embodiment).

The second-fourth bytes (EVEX Bytes 1-3) include a number of bit fields providing specific capability.

REX field 1405 (EVEX Byte 1, bits [7-5])—consists of an EVEX.R bit field (EVEX Byte 1, bit [7]-R), EVEX.X bit field (EVEX byte 1, bit [6]-X), and 1357BEX byte 1, bit [5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]-R') that is used to encode either the upper 16 or lower 16 of the extended 32 register set. In an embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]-mmmm)—its content encodes an implied leading opcode byte (0F, 0F 38, or 0F 3).

Data element width field 1364 (EVEX byte 2, bit [7]-W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]-vvvv)—the role of EVEX.vvvv may include the following: 1) EVEX.vvvv encodes the first source register operand, specified in inverted (Is complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (is complement) form. Depending on the instruction, an extra different EVEX bit field is used to extend the specifier size to 32 registers.

EVEX.U 1368 Class field (EVEX byte 2, bit [2]-U)—If EVEX.U=0, it indicates class A or EVEX.U0; if EVEX.U=1, it indicates class B or EVEX.U1.

Prefix encoding field 1425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In an embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 1354 (EVEX byte 3, bits [6:4]-SSS, also known as EVEX.s2-0, EVEX.r2-0, EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]-kkk)—its content specifies the index of a register in the write mask registers as previously described. In an embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1372 operates as previously described.

Full Opcode Field

FIG. 14B is a block diagram illustrating the fields of the specific vector friendly instruction format 1400 that make up the full opcode field 1374 according to an embodiment. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to an embodiment. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

Figure 14D:
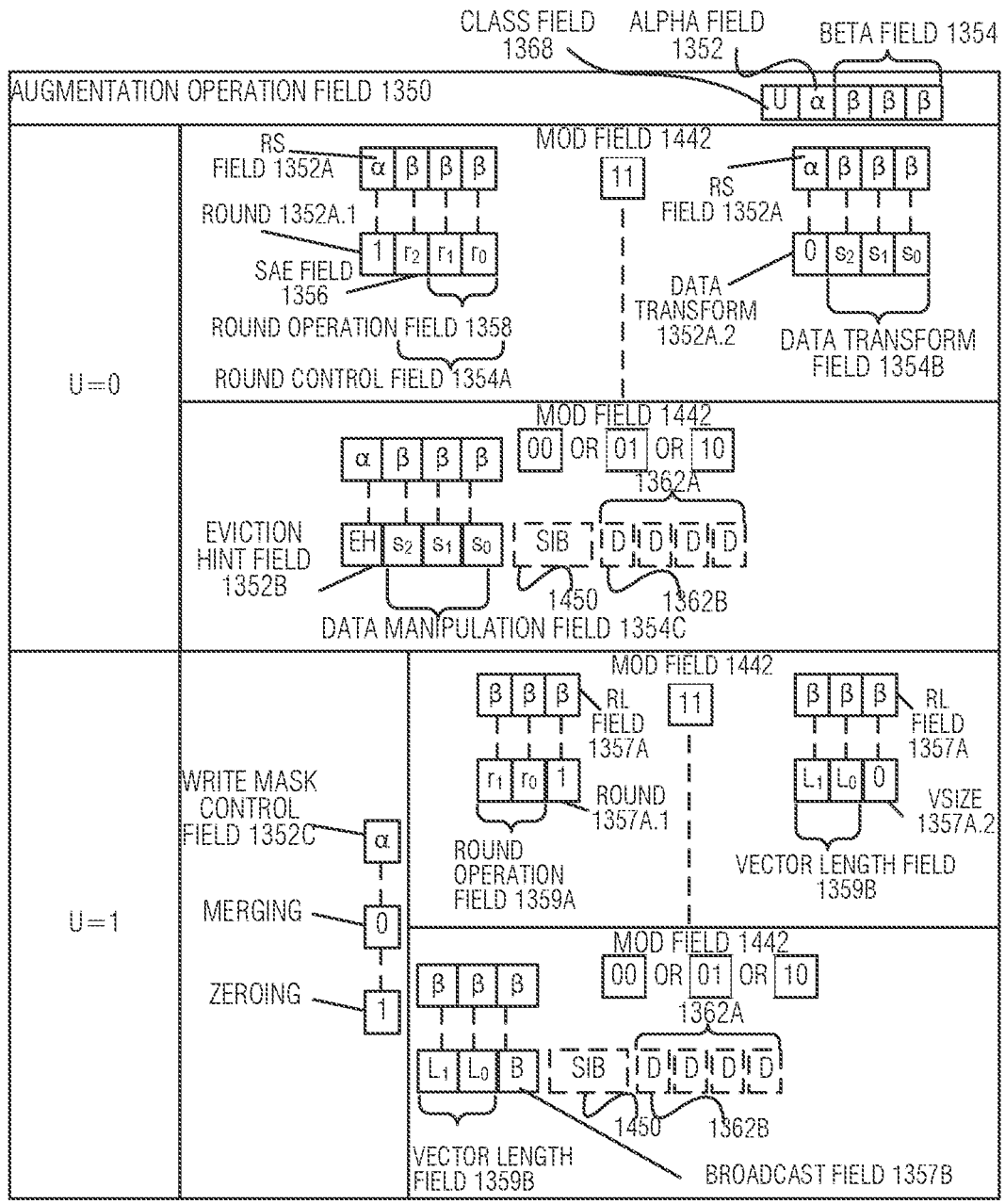

FIG. 14D is a block diagram illustrating the fields of the specific vector friendly instruction format 1400 that make up the augmentation operation field 1350 according to an embodiment. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]-EH) is interpreted as the rs field 1352A. When the rs field 1352A contains a 1 (round 1352A.1), the beta field 1354 (EVEX byte 3, bits [6:4]-SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]-SSS) is interpreted as a three bit data transform field 1354B. When U=0 and the MOD field 1442 contains 00, 01, or 10 (signifying a memory access operation), the alpha field 1352 (EVEX byte 3, bit [7]-EH) is interpreted as the eviction hint (EH) field 1352B and the beta field 1354 (EVEX byte 3, bits [6:4]-SSS) is interpreted as a three bit data manipulation field 1354C.

When U=1, the alpha field 1352 (EVEX byte 3, bit [7]-EH) is interpreted as the write mask control (Z) field 1352C. When U=1 and the MOD field 1442 contains 11 (signifying a no memory access operation), part of the beta field 1354 (EVEX byte 3, bit [4]-S0) is interpreted as the RL field 1357A; when it contains a 1 (round 1357A.1) the rest of the beta field 1354 (EVEX byte 3, bit [6-5]-S2-1) is interpreted as the round operation field 1359A, while when the RL field 1357A contains a 0 (VSIZE 1357.A2) the rest of the beta field 1354 (EVEX byte 3, bit [6-5]-S2-1) is interpreted as the vector length field 1359B (EVEX byte 3, bit [6-5]-L1-0). When U=1 and the MOD field 1442 contains 00, 01, or 10 (signifying a memory access operation), the beta field 1354 (EVEX byte 3, bits [6:4]-SSS) is interpreted as the vector length field 1359B (EVEX byte 3, bit [6-5]-L1-0) and the broadcast field 1357B (EVEX byte 3, bit [4]-B).

Register Architecture

Figure 15:
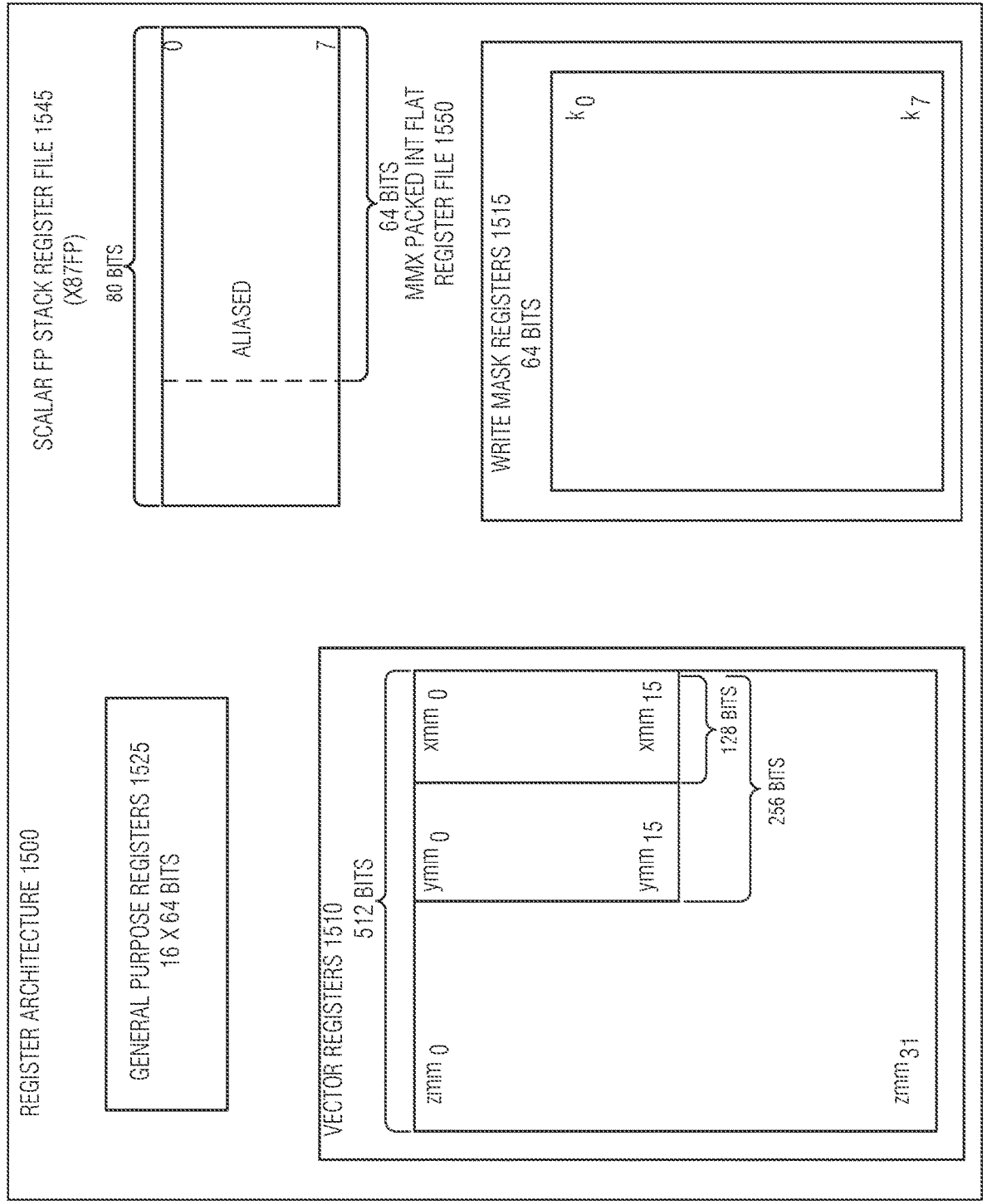
FIG. 15 is a block diagram of a register architecture according to an embodiment.

FIG. 15 is a block diagram of a register architecture 1500 according to an embodiment. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

| Adjustable Vector Length | Class | Operations | Registers |
| --- | --- | --- | --- |
| Instruction Templates that do not include the vector length field 1359B | A (FIG. 13A; U = 0) | 1310, 1315, 1325, 1330 | zmm registers (the vector length is 64 byte) |
| | B (FIG. 13B; U = 1) | 1312 | zmm registers (the vector length is 64 byte) |
| Instruction templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in an embodiment, the class B instruction templates of the specific vector friendly instruction format 1400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in an embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Core architectures are described next, followed by descriptions of processors and computer architectures.

Core Architectures

In-Order and Out-of-Order Core Block Diagram

FIG. 16A is a block diagram illustrating both an in-order pipeline and a register renaming, out-of-order issue/execution pipeline according to embodiments. FIG. 16B is a block diagram illustrating both an embodiment of an in-order architecture core and a register renaming, out-of-order issue/execution architecture core to be included in a processor according to an embodiment. The solid lined boxes in FIGS. 16A-16B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In an embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In an embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In an embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In an embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific In-Order Core Architecture

Figure 17B:
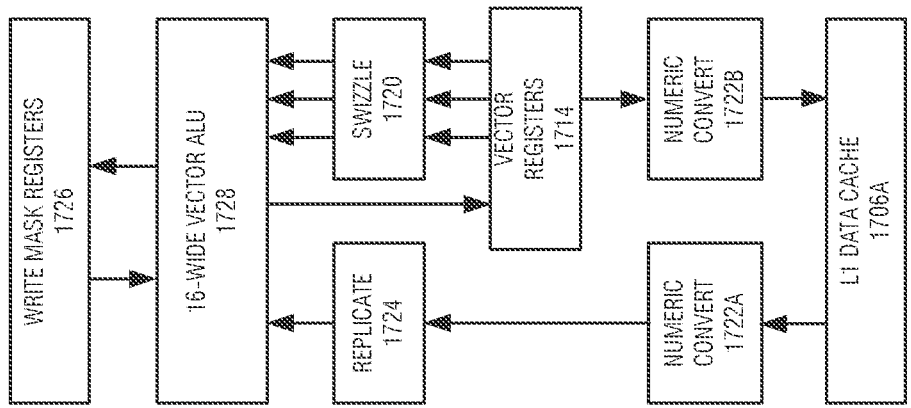
FIGS. 17A-17B illustrate block diagrams of a more specific in-order core architecture, which core would be one of several logic blocks (including other cores of the same type and/or different types) in a chip, according to an embodiment.
Figure 17A:
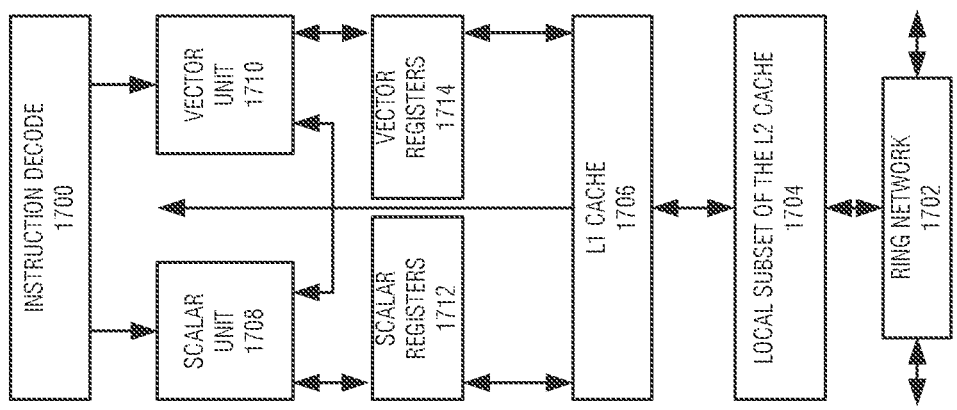

FIGS. 17A-17B illustrate a block diagram of a more specific in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to an embodiment. In an embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to an embodiment. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Figure 18:
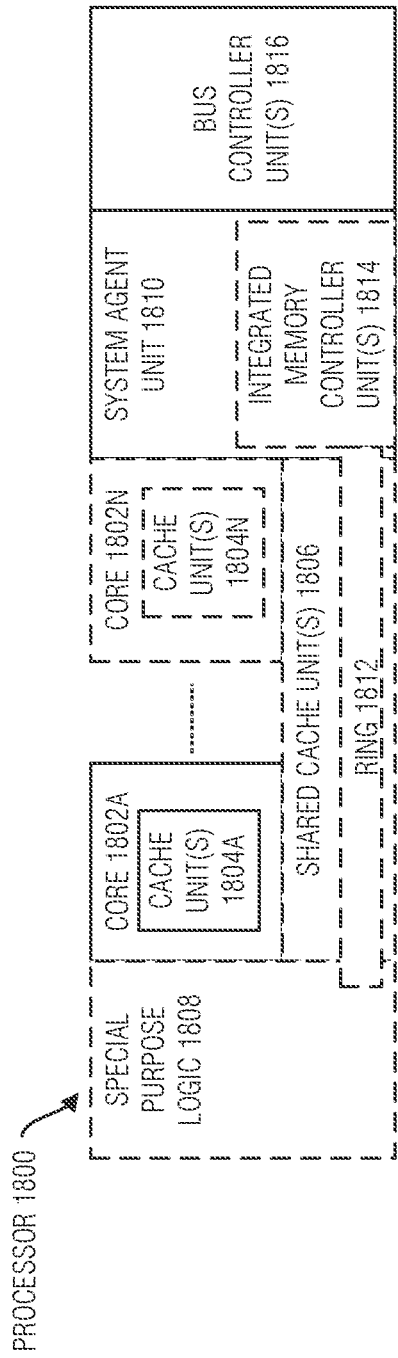
FIG. 18 is a block diagram of a processor that may have more than one core, may have an integrated memory controller, and may have integrated graphics according to an embodiment.

FIG. 18 is a block diagram of a processor 1800 that may have more than one core, may have an integrated memory controller, and may have integrated graphics according to embodiments. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In an embodiment, coherency is maintained between one or more cache units 1804A-N and cores 1802A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Computer Architectures

FIGS. 19-22 are block diagrams of computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
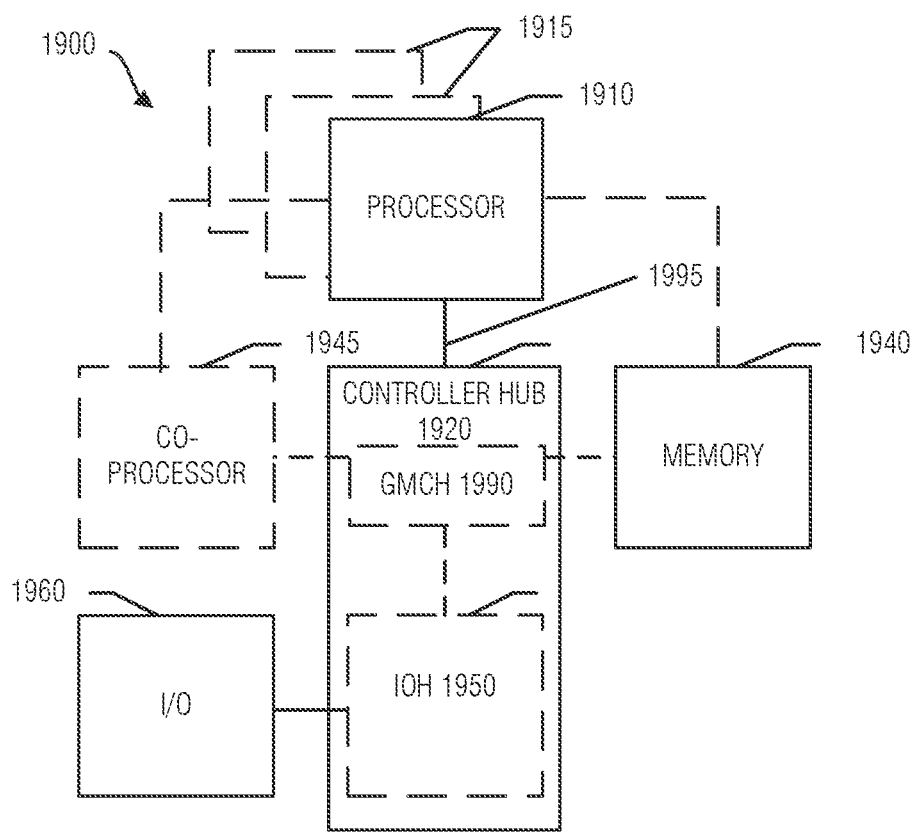
FIGS. 19-22 are block diagrams of computer architectures, according to an embodiment.

Referring now to FIG. 19, shown is a block diagram of a system 1900 according to an embodiment. The system 1900 may include one or more processors 1910, 1915, which are coupled to a controller hub 1920. In an embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In an embodiment, the coprocessor 1945 is a special-purpose processor, such as, for example, a high-throughput MIC processor, a network or communication processor, compression engine, graphics processor, GPGPU, embedded processor, or the like. In an embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In an embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
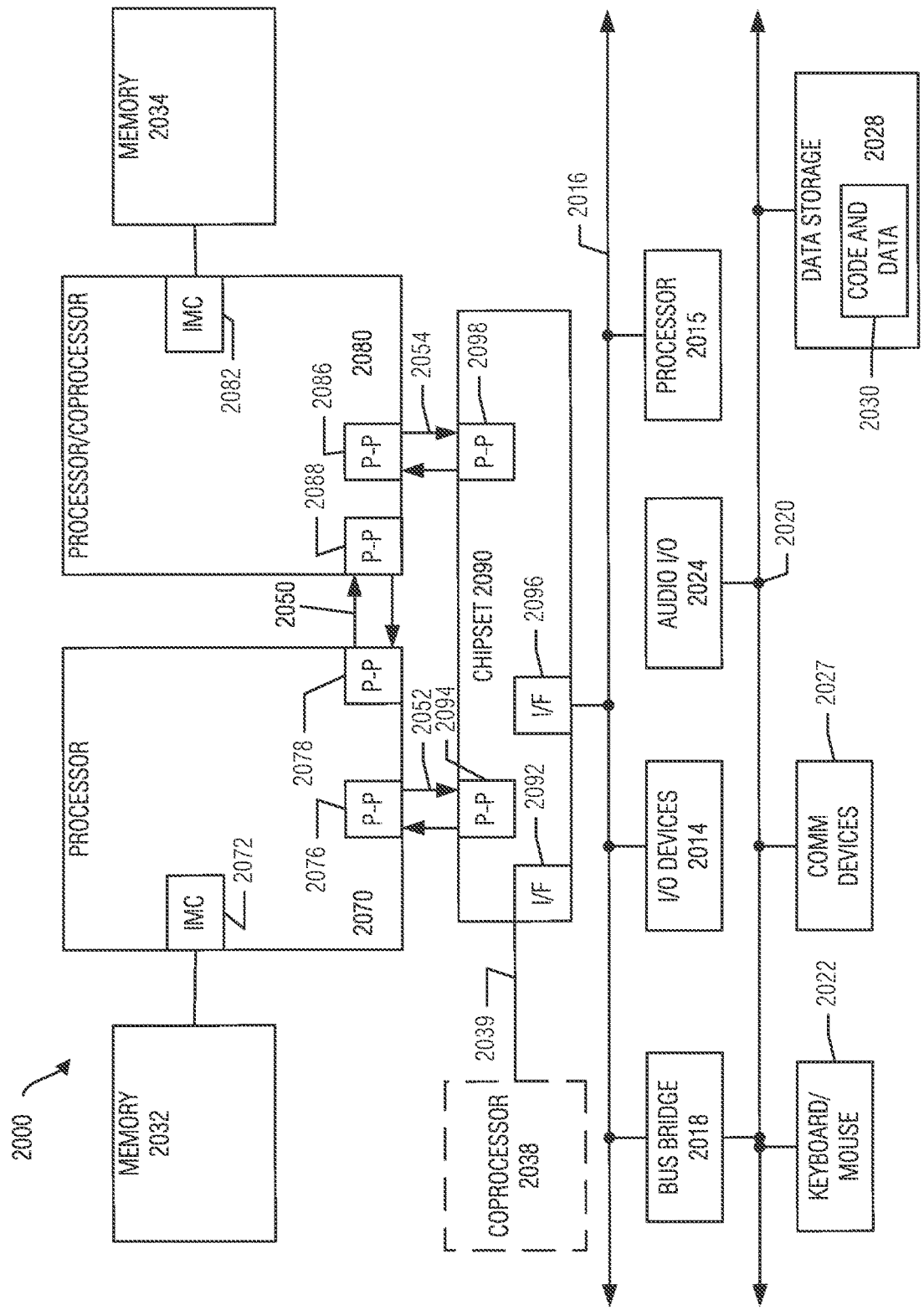

Referring now to FIG. 20, shown is a block diagram of a first more specific system 2000 in accordance with an embodiment. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In an embodiment, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In an embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In an embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In an embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In an embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in an embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
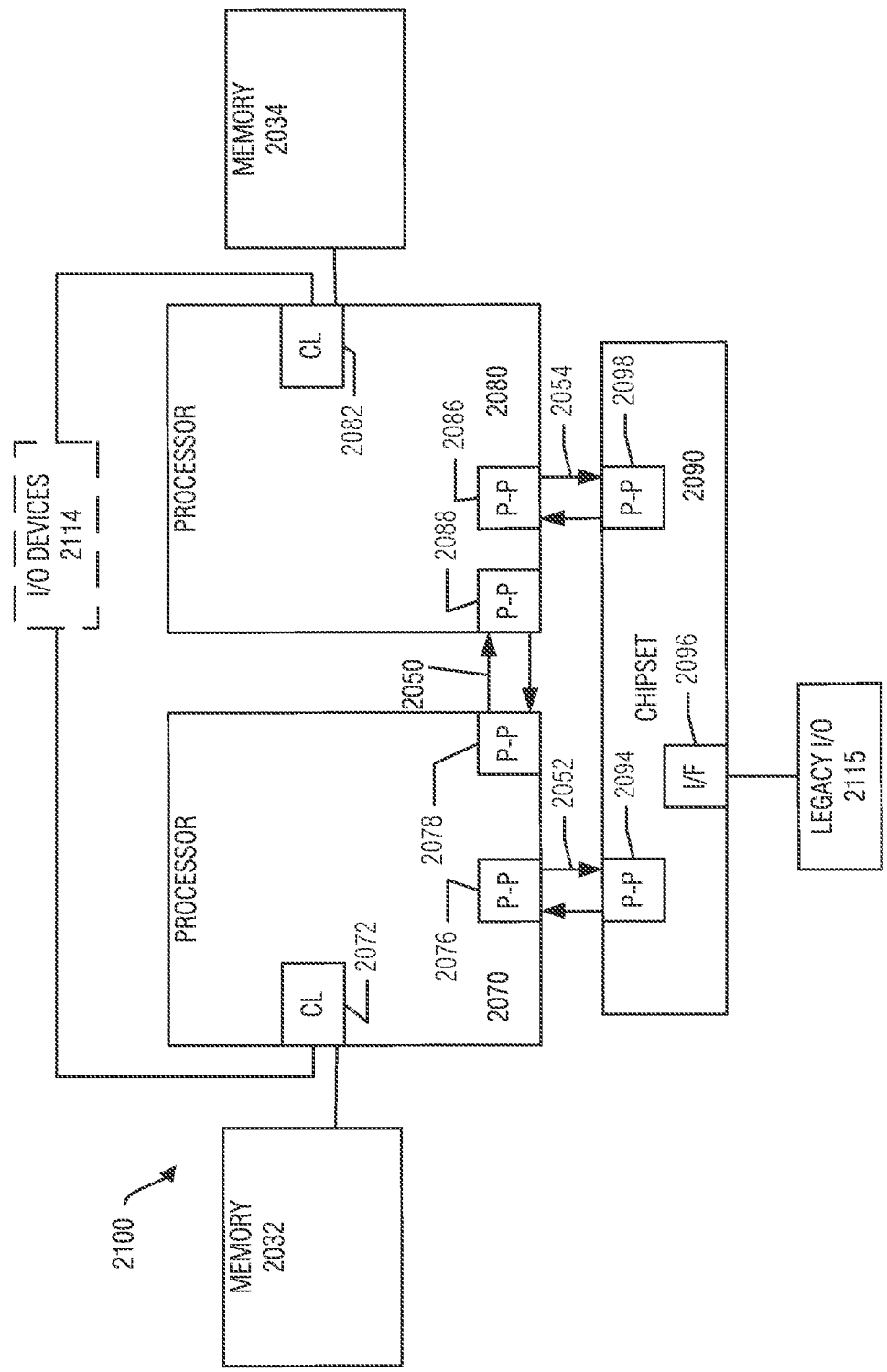

Referring now to FIG. 21, shown is a block diagram of a second more specific system 2100 in accordance with an embodiment. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
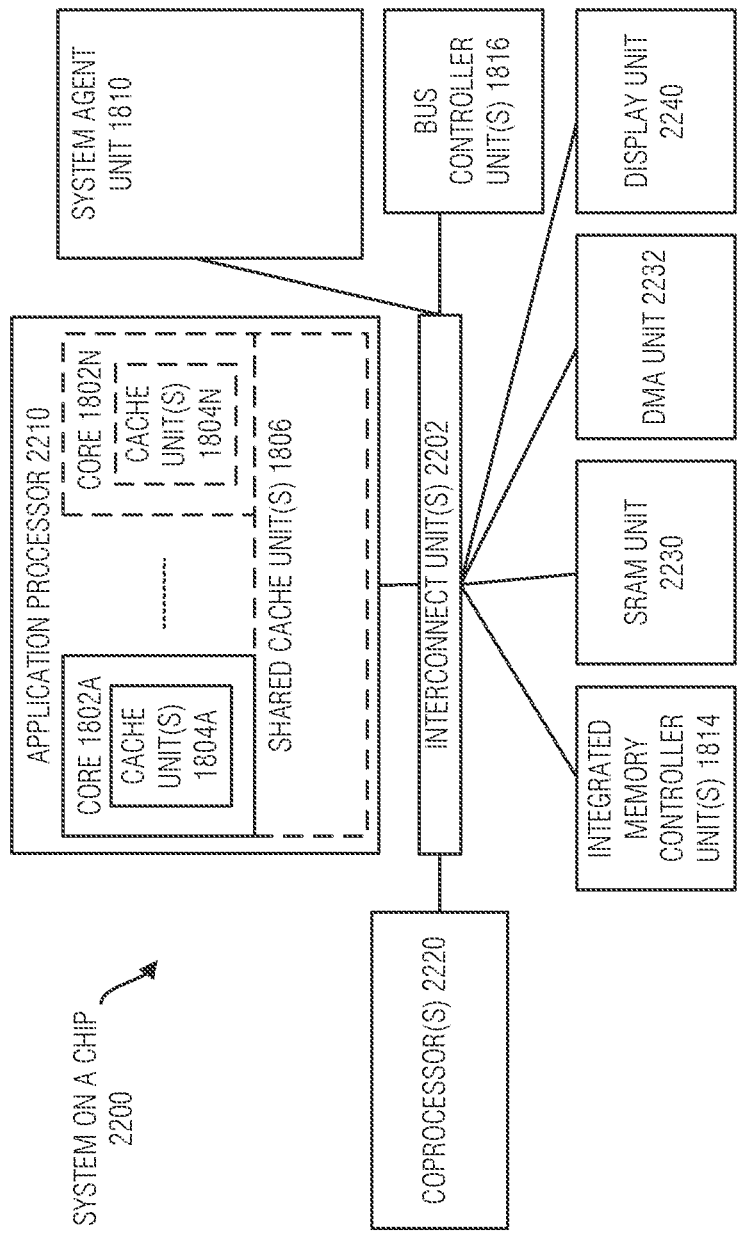

Referring now to FIG. 22, shown is a block diagram of a SoC 2200 in accordance with an embodiment. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 1802A-N with integrated cache units 1804A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In an embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
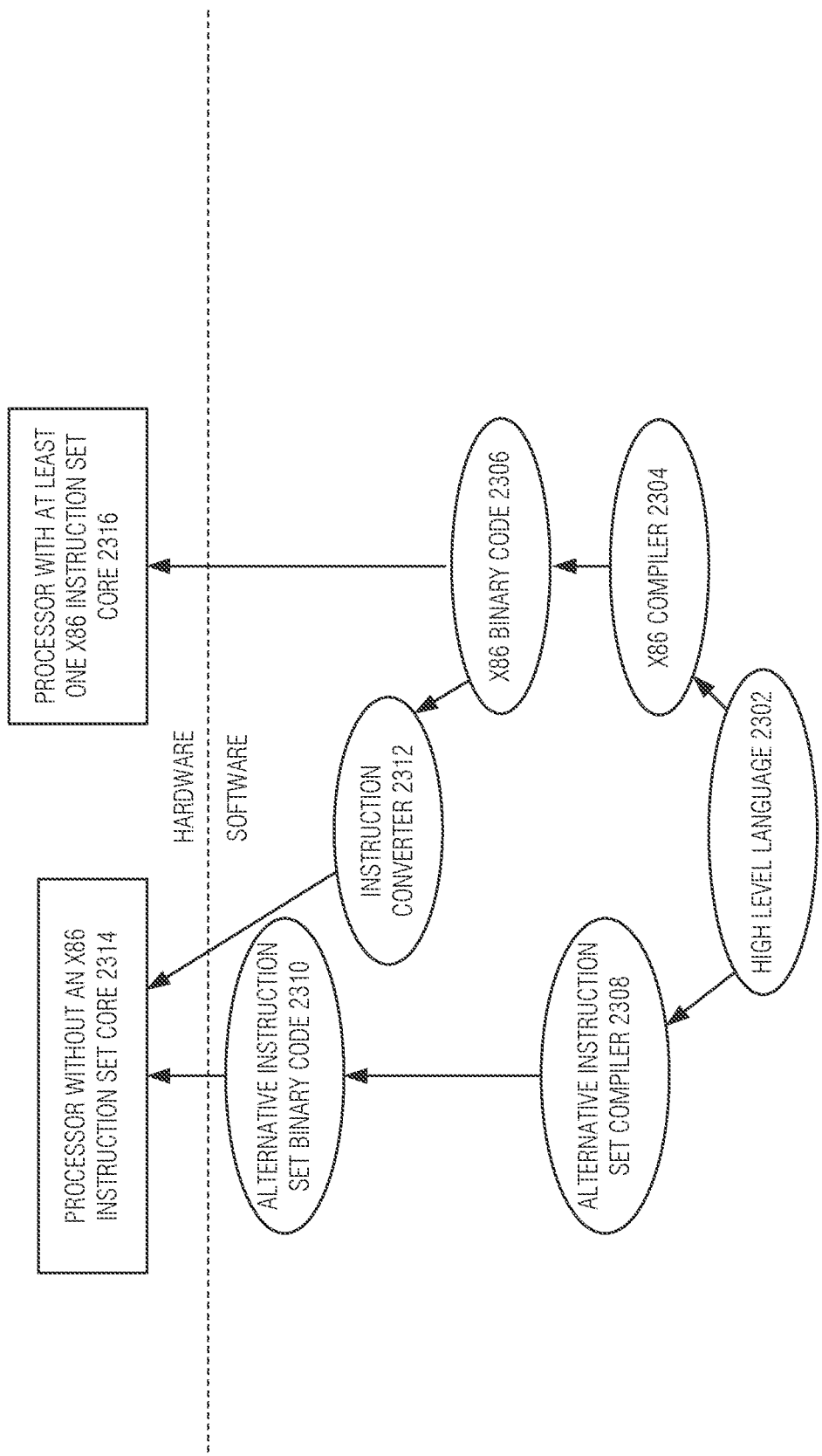
FIG. 23 is a block diagram contrasting the use of a software instruction converter to convert binary instructions in a source instruction set to binary instructions in a target instruction set according to an embodiment.

FIG. 23 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

Additional Notes & Examples

Example 1 is a system for computer memory management, the system comprising: a memory device to store data and a mapping table; and a memory overcommitment circuitry to: receive a signal to move data in a first block from a memory reduction area in the memory device to a non-memory reduction area in the memory device, the memory reduction area to store data using a memory reduction technique, and the non-memory reduction area to store data without any memory reduction techniques; allocate a second block in the non-memory reduction area; copy the data in the first block to the second block; and update the mapping table to revise a pointer to point to the second block, the mapping table used to store pointers to memory device in the memory reduction area and the non-memory reduction area.

In Example 2, the subject matter of Example 1 includes, wherein the signal to move the data in the first block includes an address parameter, the address parameter corresponding to a physical device address, the correspondence stored in the mapping table.

In Example 3, the subject matter of Examples 1-2 includes, wherein to update the mapping table, the memory overcommitment circuitry is to: modify a flag value to indicate that the second block is not to be processed with memory reduction techniques.

In Example 4, the subject matter of Example 3 includes, wherein the non-memory reduction area is a reserved area in the memory device.

In Example 5, the subject matter of Example 4 includes, wherein the memory overcommitment circuitry is to: receive a second signal to create the reserved area in the memory device; and allocate a portion of the memory device to create the reserved area.

In Example 6, the subject matter of Examples 4-5 includes, wherein the memory overcommitment circuitry is to: receive a second signal to unreserve a third block in the reserved area; allocate a fourth block in the memory reduction area; copy the data in the third block in the reserved area to the fourth block; update the mapping table to revise a pointer to point to the fourth block; and deallocate the third block in the reserved area.

In Example 7, the subject matter of Examples 1-6 includes, wherein the memory overcommitment circuitry is to: receive a second signal to unreserve a fifth block in the non-memory reduction area; and update the mapping table to revise a pointer to the fifth block, the update to modify a flag value to indicate that the block is valid to be processed with memory reduction techniques, resulting in the fifth block being considered to be in the memory reduction area.

In Example 8, the subject matter of Example 7 includes, wherein the memory overcommitment circuitry is to: perform a memory reduction technique on the fifth block.

In Example 9, the subject matter of Examples 1-8 includes, wherein the memory overcommitment circuitry is to: perform a cleanup operation on the first block.

In Example 10, the subject matter of Example 9 includes, wherein to perform the cleanup operation on the first block, the memory overcommitment circuitry is to: decrement a reference counter, the reference counter indicating how many pointers are pointing to the first block; and deallocate the first block when the reference counter is zero.

In Example 11, the subject matter of Examples 1-10 includes, wherein the memory reduction technique includes memory data compression.

In Example 12, the subject matter of Examples 1-11 includes, wherein the memory reduction technique includes memory deduplication.

Example 13 is a method of computer memory management, the method comprising: receiving, at a memory overcommitment circuitry, a signal to move data in a first block from a memory reduction area in a memory to a non-memory reduction area in the memory, the memory reduction area to store data using a memory reduction technique, and the non-memory reduction area to store data without any memory reduction techniques; allocating a second block in the non-memory reduction area; copying the data in the first block to the second block; and updating a mapping table to revise a pointer to point to the second block, the mapping table used to store pointers to memory in the memory reduction area and the non-memory reduction area.

In Example 14, the subject matter of Example 13 includes, wherein the signal to move the data in the first block includes an address parameter, the address parameter corresponding to a physical device address, the correspondence stored in the mapping table.

In Example 15, the subject matter of Examples 13-14 includes, wherein updating the mapping table comprises: modifying a flag value to indicate that the second block is not to be processed with memory reduction techniques.

In Example 16, the subject matter of Example 15 includes, wherein the non-memory reduction area is a reserved area in the memory.

In Example 17, the subject matter of Example 16 includes, receiving a second signal to create the reserved area in the memory; and allocating a portion of the memory to create the reserved area.

In Example 18, the subject matter of Examples 16-17 includes, receiving a second signal to unreserve a third block in the reserved area; allocating a fourth block in the memory reduction area; copying the data in the third block in the reserved area to the fourth block; updating the mapping table to revise a pointer to point to the fourth block; and deallocating the third block in the reserved area.

In Example 19, the subject matter of Examples 13-18 includes, receiving a second signal to unreserve a fifth block in the non-memory reduction area; and updating the mapping table to revise a pointer to the fifth block, the update to modify a flag value to indicate that the block is valid to be processed with memory reduction techniques, resulting in the fifth block being considered to be in the memory reduction area.

In Example 20, the subject matter of Example 19 includes, performing a memory reduction technique on the fifth block.

In Example 21, the subject matter of Examples 13-20 includes, performing a cleanup operation on the first block.

In Example 22, the subject matter of Example 21 includes, wherein performing the cleanup operation on the first block comprises: decrementing a reference counter, the reference counter indicating how many pointers are pointing to the first block; and deallocating the first block when the reference counter is zero.

In Example 23, the subject matter of Examples 13-22 includes, wherein the memory reduction technique includes memory data compression.

In Example 24, the subject matter of Examples 13-23 includes, wherein the memory reduction technique includes memory deduplication.

Example 25 is at least one machine-readable medium including instructions, which when executed by a machine, cause the machine to perform operations of any of the methods of Examples 13-24.

Example 26 is an apparatus comprising means for performing any of the methods of Examples 13-24.

Example 27 is an apparatus for computer memory management, the apparatus comprising: means for receiving, at a memory overcommitment circuitry, a signal to move data in a first block from a memory reduction area in a memory to a non-memory reduction area in the memory, the memory reduction area to store data using a memory reduction technique, and the non-memory reduction area to store data without any memory reduction techniques; means for allocating a second block in the non-memory reduction area; means for copying the data in the first block to the second block; and means for updating a mapping table to revise a pointer to point to the second block, the mapping table used to store pointers to memory in the memory reduction area and the non-memory reduction area.

In Example 28, the subject matter of Example 27 includes, wherein the signal to move the data in the first block includes an address parameter, the address parameter corresponding to a physical device address, the correspondence stored in the mapping table.

In Example 29, the subject matter of Examples 27-28 includes, wherein the means for updating the mapping table comprise: means for modifying a flag value to indicate that the second block is not to be processed with memory reduction techniques.

In Example 30, the subject matter of Example 29 includes, wherein the non-memory reduction area is a reserved area in the memory.

In Example 31, the subject matter of Example 30 includes, means for receiving a second signal to create the reserved area in the memory; and means for allocating a portion of the memory to create the reserved area.

In Example 32, the subject matter of Examples 30-31 includes, means for receiving a second signal to unreserve a third block in the reserved area; means for allocating a fourth block in the memory reduction area; means for copying the data in the third block in the reserved area to the fourth block; means for updating the mapping table to revise a pointer to point to the fourth block; and means for deallocating the third block in the reserved area.

In Example 33, the subject matter of Examples 27-32 includes, means for receiving a second signal to unreserve a fifth block in the non-memory reduction area; and means for updating the mapping table to revise a pointer to the fifth block, the update to modify a flag value to indicate that the block is valid to be processed with memory reduction techniques, resulting in the fifth block being considered to be in the memory reduction area.

In Example 34, the subject matter of Example 33 includes, means for performing a memory reduction technique on the fifth block.

In Example 35, the subject matter of Examples 27-34 includes, means for performing a cleanup operation on the first block.

In Example 36, the subject matter of Example 35 includes, wherein the means for performing the cleanup operation on the first block comprise: means for decrementing a reference counter, the reference counter indicating how many pointers are pointing to the first block; and means for deallocating the first block when the reference counter is zero.

In Example 37, the subject matter of Examples 27-36 includes, wherein the memory reduction technique includes memory data compression.

In Example 38, the subject matter of Examples 27-37 includes, wherein the memory reduction technique includes memory deduplication.

Example 39 is at least one machine-readable medium including instructions for computer memory management, the instructions when executed by a machine, cause the machine to perform the operations comprising: receiving, at a memory overcommitment circuitry, a signal to move data in a first block from a memory reduction area in a memory to a non-memory reduction area in the memory, the memory reduction area to store data using a memory reduction technique, and the non-memory reduction area to store data without any memory reduction techniques; allocating a second block in the non-memory reduction area; copying the data in the first block to the second block; and updating a mapping table to revise a pointer to point to the second block, the mapping table used to store pointers to memory in the memory reduction area and the non-memory reduction area.

In Example 40, the subject matter of Example 39 includes, wherein the signal to move the data in the first block includes an address parameter, the address parameter corresponding to a physical device address, the correspondence stored in the mapping table.

In Example 41, the subject matter of Examples 39-40 includes, wherein updating the mapping table comprises: modifying a flag value to indicate that the second block is not to be processed with memory reduction techniques.

In Example 42, the subject matter of Example 41 includes, wherein the non-memory reduction area is a reserved area in the memory.

In Example 43, the subject matter of Example 42 includes, receiving a second signal to create the reserved area in the memory; and allocating a portion of the memory to create the reserved area.

In Example 44, the subject matter of Examples 42-43 includes, receiving a second signal to unreserve a third block in the reserved area; allocating a fourth block in the memory reduction area; copying the data in the third block in the reserved area to the fourth block; updating the mapping table to revise a pointer to point to the fourth block; and deallocating the third block in the reserved area.

In Example 45, the subject matter of Examples 39-44 includes, receiving a second signal to unreserve a fifth block in the non-memory reduction area; and updating the mapping table to revise a pointer to the fifth block, the update to modify a flag value to indicate that the block is valid to be processed with memory reduction techniques, resulting in the fifth block being considered to be in the memory reduction area.

In Example 46, the subject matter of Example 45 includes, performing a memory reduction technique on the fifth block.

In Example 47, the subject matter of Examples 39-46 includes, performing a cleanup operation on the first block.

In Example 48, the subject matter of Example 47 includes, wherein performing the cleanup operation on the first block comprises: decrementing a reference counter, the reference counter indicating how many pointers are pointing to the first block; and deallocating the first block when the reference counter is zero.

In Example 49, the subject matter of Examples 39-48 includes, wherein the memory reduction technique includes memory data compression.

In Example 50, the subject matter of Examples 39-49 includes, wherein the memory reduction technique includes memory deduplication.

Example 51 is at least one machine-readable medium including instructions that, when executed by processing circuitry, cause the processing circuitry to perform operations to implement of any of Examples 1-50.

Example 52 is an apparatus comprising means to implement of any of Examples 1-50.

Example 53 is a system to implement of any of Examples 1-50.

Example 54 is a method to implement of any of Examples 1-50.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for computer memory management, the system comprising:
   a memory device within an overcommitted memory system; and
   a memory overcommitment circuitry to:
   receive a signal to reserve data copied from a first block in the memory device to a second block in the memory device, the data associated with a critical system process; and
   update a mapping table to revise a pointer to point to the second block and mark the second block as reserved to disable a memory reduction within the second block and to guarantee a physical data space, the memory reduction including at least one of a memory compression and a memory deduplication.

2. The system of claim 1, wherein the memory overcommitment circuitry is to:
   allocate the second block in the memory device responsive to receiving the signal to reserve data; and
   copy the data from the first block to the second block.

3. The system of claim 1, wherein:
   the first block is within a memory reduction area in the memory device, the memory reduction area to store data using a memory reduction technique; and
   the second block is within a non-memory reduction area in the memory device, the non-memory reduction area to store data without any memory reduction techniques.

4. The system of claim 3, wherein the non-memory reduction area is a reserved area in the memory device.

5. The system of claim 4, wherein the memory overcommitment circuitry is to:
   receive a second signal to create the reserved area in the memory device; and
   allocate a portion of the memory device to create the reserved area.

6. The system of claim 4, wherein the memory overcommitment circuitry is to:
   receive a second signal to unreserve a third block in the reserved area;
   allocate a fourth block in the memory reduction area;
   copy the data in the third block in the reserved area to the fourth block;
   update the mapping table to revise a pointer to point to the fourth block; and
   deallocate the third block in the reserved area.

7. The system of claim 3, wherein the memory overcommitment circuitry is to:
   receive a second signal to unreserve a fifth block in the non-memory reduction area; and
   update the mapping table to revise a pointer to the fifth block, the pointer to indicate that the fifth block is valid to be processed with memory reduction techniques, resulting in the fifth block being considered to be in the memory reduction area.

8. The system of claim 1, wherein the signal to reserve the data in the first block includes an address parameter, the address parameter corresponding to a physical data space device address, the address parameter stored in the mapping table.

9. The system of claim 1, wherein to update the mapping table, the memory overcommitment circuitry is to modify a flag value to indicate that the second block is not to be processed with memory reduction techniques.

10. The system of claim 1, wherein:
    the memory overcommitment circuitry is to perform a cleanup operation on the first block; and
    to perform the cleanup operation on the first block, the memory overcommitment circuitry is to decrement a reference counter, the reference counter indicating how many pointers are pointing to the first block, and deallocate the first block when the reference counter is zero.

11. A method of computer memory management, the method comprising:
    receiving, at a memory overcommitment circuitry, a signal to reserve data copied in a memory device within an overcommitted memory system from a first block to a second block, the data associated with a critical system process; and
    updating a mapping table to revise a pointer to point to the second block and mark the second block as reserved to disable a memory reduction within the second block and to guarantee a physical data space, the memory reduction including at least one of a memory compression and a memory deduplication.

12. The method of claim 11, further comprising:
    allocating the second block in the memory device responsive to receiving the signal to reserve data; and
    copying the data from the first block to the second block.

13. The method of claim 11, wherein:
    the first block is within a memory reduction area in the memory device, the memory reduction area to store data using a memory reduction technique; and
    the second block is within a non-memory reduction area in the memory device, the non-memory reduction area to store data without any memory reduction techniques.

14. The method of claim 13, wherein the non-memory reduction area is a reserved area in the memory device.

15. The method of claim 14, further comprising:
    receiving a second signal to create the reserved area in the memory device; and
    allocating a portion of the memory device to create the reserved area.

16. The method of claim 14, further comprising:
    receiving a second signal to unreserve a third block in the reserved area;
    allocating a fourth block in the memory reduction area;
    copying the data in the third block in the reserved area to the fourth block;
    updating the mapping table to revise a pointer to point to the fourth block; and
    deallocating the third block in the reserved area.

17. The method of claim 13, further comprising:
    receiving a second signal to unreserve a fifth block in the non-memory reduction area; and updating the mapping table to revise a pointer to the fifth block, the pointer to indicate that the fifth block is valid to be processed with memory reduction techniques, resulting in the fifth block being considered to be in the memory reduction area.

18. The method of claim 11, wherein the signal to reserve the data in the first block includes an address parameter, the address parameter corresponding to a physical data space device address, the address parameter stored in the mapping table.

19. The method of claim 11, wherein updating the mapping table comprises:
modifying a flag value to indicate that the second block is not to be processed with memory reduction techniques.

20. The method of claim 11, further comprising performing a cleanup operation on the first block, wherein performing the cleanup operation on the first block comprises:
decrementing a reference counter, the reference counter indicating how many pointers are pointing to the first block; and
deallocating the first block when the reference counter is zero.

21. At least one non-transitory machine-readable medium including instructions for computer memory management, the instructions when executed by a machine, cause the machine to perform operations comprising:
receiving, at a memory overcommitment circuitry, a signal to reserve data copied in a memory device within an overcommitted memory system from a first block to a second block, the data associated with a critical system process; and
updating a mapping table to revise a pointer to point to the second block and mark the second block as reserved to disable a memory reduction within the second block and to guarantee a physical data space, the memory reduction including at least one of a memory compression and a memory deduplication.

22. The at least one non-transitory machine-readable medium of claim 21, the instructions causing the machine to perform further operations comprising:
allocating the second block in the memory device responsive to receiving the signal to reserve data; and
copying the data from the first block to the second block.

23. The at least one non-transitory machine-readable medium of claim 21, wherein:
the first block is within a memory reduction area in the memory device, the memory reduction area to store data using a memory reduction technique; and
the second block is within a non-memory reduction area in the memory device, the non-memory reduction area to store data without any memory reduction techniques.

24. The at least one non-transitory machine-readable medium of claim 21, wherein the signal to reserve the data in the first block includes an address parameter, the address parameter corresponding to a physical data space device address, the address parameter stored in the mapping table.

25. The at least one non-transitory machine-readable medium of claim 21, wherein updating the mapping table comprises:
modifying a flag value to indicate that the second block is not to be processed with memory reduction techniques.

* * * * *